(12) United States Patent
Mo et al.

(10) Patent No.: US 12,363,375 B2
(45) Date of Patent: Jul. 15, 2025

(54) VIDEO PROCESSING METHOD FOR APPLICATION, AND ELECTRONIC DEVICE

(71) Applicant: BEIJING ZITIAO NETWORK TECHNOLOGY CO., LTD., Beijing (CN)

(72) Inventors: Weishu Mo, Beijing (CN); Wanli Che, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 120 days.

(21) Appl. No.: 18/550,557

(22) PCT Filed: Mar. 14, 2022

(86) PCT No.: PCT/CN2022/080553
§ 371 (c)(1),
(2) Date: Sep. 14, 2023

(87) PCT Pub. No.: WO2022/194070
PCT Pub. Date: Sep. 22, 2022

(65) Prior Publication Data
US 2024/0179368 A1 May 30, 2024

(30) Foreign Application Priority Data
Mar. 17, 2021 (CN) .......................... 202110287788.9

(51) Int. Cl.
*H04N 21/431* (2011.01)
*H04N 21/439* (2011.01)
(52) U.S. Cl.
CPC ....... *H04N 21/4318* (2013.01); *H04N 21/439* (2013.01)
(58) Field of Classification Search
CPC .......................... H04N 21/4318; H04N 21/439
See application file for complete search history.

(56) References Cited

U.S. PATENT DOCUMENTS 8,843,375 B1 9/2014 Ubillos
11,621,022 B2 * 4/2023 Zheng ................... G06F 3/0484
386/285

(Continued)

FOREIGN PATENT DOCUMENTS

CN 105827997 8/2016
CN 109451245 3/2019

(Continued)

OTHER PUBLICATIONS

Office Action in Chinese Appln. No. 202110287788.9, dated May 7, 2022, 23 pages (with English translation).

(Continued)

*Primary Examiner* — Mulugeta Mengesha
(74) *Attorney, Agent, or Firm* — Fish & Richardson P.C.

(57) ABSTRACT

The present disclosure relates to a video processing method for an application, and an electronic device. The method comprises: during a video editing process, receiving an editing instruction for audio; in response to the editing instruction, acquiring the duration of the audio and a time parameter of a video; when the duration of the audio and the time parameter of the video meet a preset condition, displaying a repeat play control in an audio editing page; when it is detected that the repeat play control is turned on, repeatedly configuring the audio within a time range represented by the time parameter of the video; and when it is detected that the repeat play control is turned off, not repeatedly configuring the audio within the time range represented by the time parameter of the video. Therefore, it is convenient for a user to manually control, by means of a control, whether audio is repeatedly played, so that the user can freely control the duration of the audio according to a play duration, thereby improving the degree of freedom of the user in video creation.

20 Claims, 35 Drawing Sheets

(56) References Cited

U.S. PATENT DOCUMENTS

2021/0195284 A1* 6/2021 Song .................. H04N 21/4722
2022/0068314 A1 3/2022 Hu et al.
2022/0279239 A1* 9/2022 Wang ................. H04N 21/8547

FOREIGN PATENT DOCUMENTS

| CN | 110324718 A | 10/2019 |
| CN | 110971957 | 4/2020 |
| CN | 111026305 A | 4/2020 |
| CN | 111491211 | 8/2020 |
| CN | 112153307 A | 12/2020 |
| CN | 113038014 A | 6/2021 |
| KR | 101950497 | 2/2019 |
| WO | WO 2020134560 | 7/2020 |

OTHER PUBLICATIONS

International Search Report and Written Opinion, International Patent Application No. PCT/CN2022/080553, Apr. 28, 2022, with English translation of Search Report.

* cited by examiner

VIDEO PROCESSING METHOD FOR APPLICATION, AND ELECTRONIC DEVICE

This application is a national stage of International Application No. PCT/CN2022/080553, filed on Mar. 14, 2022, which claims priority to Chinese Patent Application No. 202110287788.9, titled "VIDEO PROCESSING METHOD FOR APPLICATION, AND ELECTRONIC DEVICE", filed on Mar. 17, 2021 with the China National Intellectual Property Administration, both of which are incorporated herein by reference in their entireties.

FIELD

The present disclosure relates to the field of Internet technology, and in particular to a video processing method for an application and an electronic device.

BACKGROUND

With the consecutive development of Internet technologies, users often choose applications (APPs) to create videos. However, the users cannot use the existing APP to set the audio to play the video on repeat. As a result, the users are reluctant to create the video or post the created video in the APP.

SUMMARY

In order to solve or at least partly solve the above technical problems, a video processing method for an application and an electronic device are provided according to the present disclosure.

In a first aspect, a video processing method for an application is provided according to the present disclosure. The method includes:
  receiving an editing instruction for an audio, in a process of editing a video;
  acquiring a duration of the audio and a time parameter of the video, in response to the editing instruction;
  displaying a loop-play control on an audio editing page, in a case that the duration of the audio and the time parameter of the video meet a preset condition;
  configuring the audio to be on a loop within a time range indicated by the time parameter of the video, in a case that the loop-play control is detected to be enabled: and
  configuring the audio to be not on a loop within the time range indicated by the time parameter of the video, in a case that the loop-play control is detected to be disabled.

With the method provided by the first aspect, the electronic device may receive an editing instruction for an audio in a process of editing the video: and acquire a duration of the audio and a time parameter of the video after receiving the editing instruction: and display a loop-play control on an audio editing page in the case that the duration of the audio and the time parameter of the video meet a preset condition. In this way, the electronic device may configure the audio to be on a loop within a time range indicated by the time parameter of the video, in the case that the loop-play control is detected to be enabled: and configure the audio to be not on a loop within the time range indicated by the time parameter of the video, in the case that the loop-play control is detected to be disabled.

Hence, according to practical scenario, the electronic device can display a control on the page, which is convenient for the user to manually control whether to loop the audio by means of the control. In this way, the user can freely control the duration of the audio based on the play duration, which improves the freedom of the user in creating videos and offers full creative freedom and convenience to the user, and thus facilitates more users to create and post videos in the application.

In an optional implementation, the method further includes: displaying the audio editing page without the loop-play control, in a case that the duration of the audio and the time parameter of the video do not meet the preset condition.

In this way, the loop-play control can be dynamically displayed on the audio editing page, which is beneficial for the application program to flexibly display content of the page according to practical cases.

In an optional implementation, before receiving the editing instruction for the audio, the method further includes: acquiring a captured video.

In an optional implementation, the method further includes: in a case that the time parameter of the video is a play duration of the video: the duration of the audio and the time parameter of the video meeting the preset condition includes: meeting the preset condition, in a case that a play duration of the audio is less than the play duration of the video: meeting the preset condition, in a case that the play duration of the audio is less than the play duration of the video and a licensed duration of the audio is less than the play duration of the audio: or meeting the preset condition, in a case that the play duration of the audio is greater than the play duration of the video and the licensed duration of the audio is less than the play duration of the video.

In an optional implementation, the method further includes: capturing the video with the audio configured on the loop.

In an optional implementation, the time parameter of the video is a capturing mode duration for capturing the video: the duration of the audio and the time parameter of the video meeting a preset condition includes: meeting the preset condition, in a case that a play duration of the audio is less than the capturing mode duration: meeting the preset condition, in a case that the play duration of the audio is less than the capturing mode duration and a licensed duration of the audio is less than the play duration of the audio: or meeting the preset condition, in a case that the play duration of the audio is greater than the capturing mode duration and the licensed duration of the audio is less than the capturing mode duration.

In an optional implementation, in the case that the loop-play control is detected to be enabled, the method further includes: on the audio editing interface, automatically looping a waveform of the audio of a portion selected by a user from beginning to end, until the time range indicated by the time parameter of the video is fully filled.

In a second aspect, an electronic device is provided according to the present disclosure. The electronic device includes: a memory and a processor. The memory is configured to store program instructions. The processor is configured to invoke program instructions in the memory to cause the electronic device to implement the video processing method for the application according to the first aspect and any possible implementations of the first aspect.

In a third aspect, a computer storage medium is provided according to the present disclosure, where the computer storage medium includes computer instructions. The computer instructions, when running on an electronic device, cause the electronic device to implement the video processing method for the application according to the first aspect and any possible implementations of the first aspect.

In a fourth aspect, a computer program product is provided according to the present disclosure. The computer program product, when running on a computer, causes the computer to implement the video processing method for the application according to the first aspect and any possible implementations of the first aspect.

BRIEF DESCRIPTION OF THE DRAWINGS

The drawings herein are incorporated into the specification and constitute a part of the specification, which show embodiments that comply with the present disclosure. The drawings and the specification are used as a whole to explain the principle of the present disclosure.

In order to more clearly illustrate the embodiments of the present disclosure or the technical solutions in the conventional technologies, the drawings used in the description of the embodiments or the conventional technologies are briefly introduced below. It is apparent that, for those skilled in the art, other drawings can be obtained according to the provided drawings without any creative effort.

DETAILED DESCRIPTION OF EMBODIMENTS

Figure 1A:
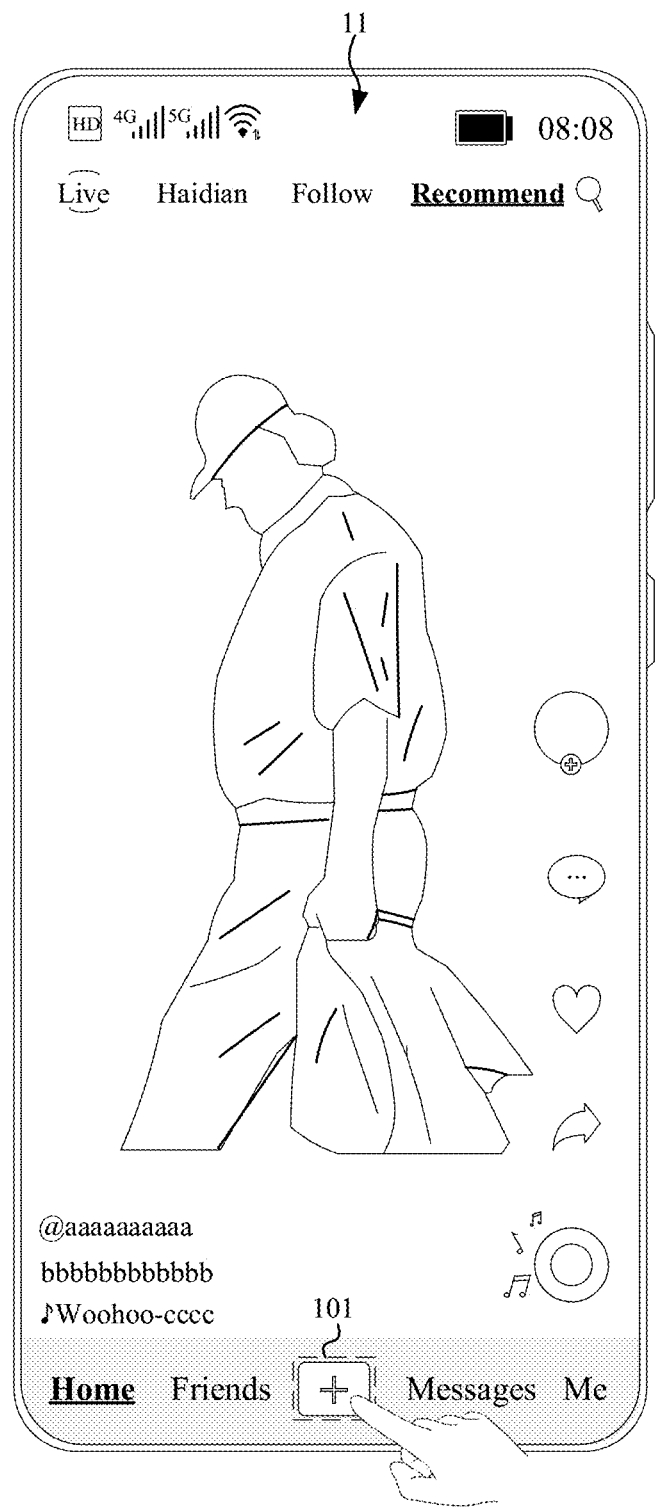
FIG. 1A to 1B are schematic diagrams of human-computer interaction interfaces according to an embodiment of the present disclosure.

In order to understand the above purposes, features, and advantage of the present disclosure more clearly, the technical solutions according to the present disclosure will be further described. It should be noted that the embodiments of the present disclosure and the features in the embodiments may be combined with each other if there is no conflict.

In the following description, numerous specific details are set forth in order to provide thorough understanding of the present disclosure. However, the present disclosure may also be implemented in other ways different from those described here. Obviously, the embodiments in the specification are only a part of the embodiments of the present disclosure, rather than all the embodiments.

Exemplarily, a video processing method for an application, a device, a computer storage medium and a computer program product are provided according to the present disclosure. In a practical scenario, the duration of the audio and the duration of the video are analyzed, and in the case that the duration of the audio is insufficient, a control for controlling whether the audio is played on a loop is displayed on a page of the application. In this way, the user can decide whether the audio is played on a loop in the process of playing the video, based on the operation on the control. Thus, the intention of users is fully respected, and the duration of audio can be freely controlled by the user based on the duration of the video, thus improving the freedom of users in creating videos in the application, and providing sufficient creative space and convenience to the user by the application, which facilitates more users to create and post videos in the application.

The duration of the audio may be understood as play duration of the audio, or licensed duration of the audio. The play duration of the audio is a total duration for playing the audio. The licensed duration of the audio is duration of a clippable part of the audio.

The duration of the video or the time parameter of the video may be understood as play duration of the video, or capturing mode duration for capturing the video. The play duration of the video is total duration for playing the video. The capturing mode duration for capturing the video is the maximum duration allowed for the user to capture the video in one capturing mode.

The video processing method for the application in the embodiments of the present disclosure is executed by the electronic device. Electronic devices may be tablet computers, mobile phones (such as folding screen mobile phones, large-screen mobile phones, etc.), wearable devices, vehicle-mounted devices, augmented reality (AR)/virtual reality (VR) device, notebook computers, ultra-mobile personal computer (UMPC), netbook, personal digital assistant (PDA), and the internet of things (IOT) devices such as smart TVs, smart screens, high-definition TVs, 4K TVs, smart speakers, smart projectors and the like. The specific type of the electronic device is not limited in the embodiments of the present disclosure.

The type of the operating system of the electronic device is not limited in the embodiments of the present disclosure. For example, it may be an Android system, Linux system, Windows system and iOS system, etc.

Based on the foregoing description, in an embodiment of the present disclosure, an electronic device is taken as an example to describe the video processing method for the application provided by the embodiment of the present disclosure in combination with the drawings and application scenarios in detail.

With reference to FIGS. 1A to 1B, FIGS. 2A to 2M, FIGS. 3A to 3O and FIGS. 4A to 4D, specific implementation processes of a video processing method for an application are provided according to the embodiments of the present disclosure.

For the convenience of explanation, in FIGS. 1A to 1B, FIGS. 2A to 2M, FIGS. 3A to 3O and FIGS. 4A to 4D, as an example, the electronic device is a mobile phone, and a short video social application 1 (i.e., APP 1) is installed in the mobile phone.

Figure 1B:
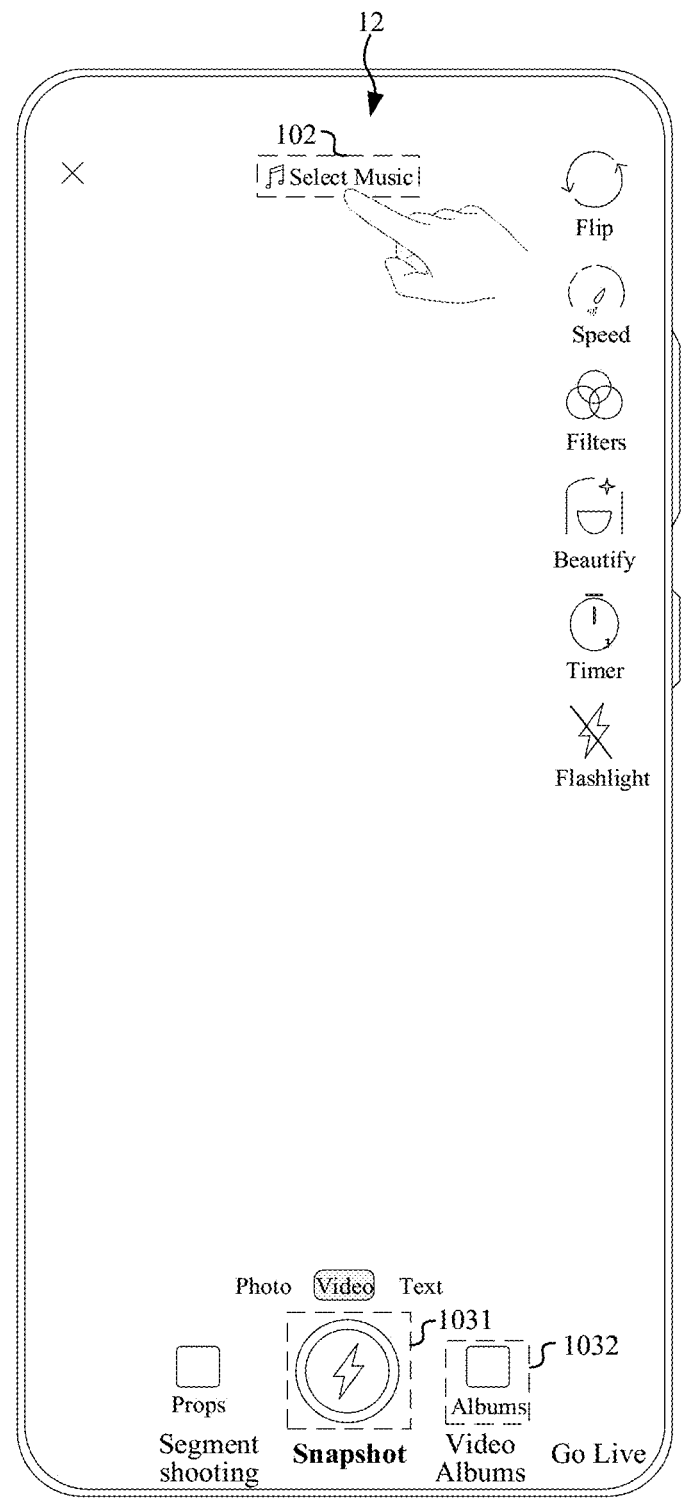

With reference to FIGS. 1A to 1B, FIGS. 1A to 1B are schematic diagrams of human-computer interaction interfaces according to an embodiment of the present disclosure.

The application 1 may display a user interface 11 exemplarily shown in FIG. 1A on the mobile phone. The user interface 11 is used to display a home page of the application 1. The application 1 executes a certain function set on the home page of the application 1, such as playing multimedia information (such as a short video). The user interface 11 may include: a control 101 configured to enter a creation page of the application 1. The creation page is used to display a screen in which the user creates a video.

After receiving an operation performed by the user on the user interface 11 shown in FIG. 1A, such as clicking on the control 101, the application 1 may display the user interface 12 exemplarily shown in FIG. 1B. The user interface 12 is used for displaying the creation page of the application 1.

On the user interface 12, the application 1 may provide the user with an entrance for processing audio before a video is captured in real time, an entrance for processing audio after the video is captured in real time, and an entrance for processing audio after the video that has been captured in the mobile phone is inserted by the user.

Based on the foregoing description, the specific implementation processes of processing the audio in the video of application 1 by the user may be described in three scenarios.

First Scenario

Referring to FIG. 2A to FIG. 2M, FIG. 2A to FIG. 2M are schematic diagrams of human-computer interaction interfaces according to the embodiments of the present disclosure.

In FIG. 1B, the user interface 12 may include a control 102. The control 102 is configured to provide an entrance for processing audio and display the title of the selected audio.

Figure 2A:
FIG. 2A to 2M are schematic diagrams of human-computer interaction interfaces according to an embodiment of the present disclosure.

After receiving an operation performed by the user on the user interface 12 shown in FIG. 1B, such as clicking on the control 102, the application 1 may display the page 13 exemplarily shown in FIG. 2A on the user interface 12. The page 13 is used to provide audios that can be used in the videos.

The page 13 may include an area 1041. The area 1041 is used to display relevant information of one audio 1, such as a title of a song 2, an account number of a singer b, a cover of an audio 1, and play duration of the audio 1, i.e., "xx:xx". In addition, the area 1041 provides an entrance for editing the audio 1.

Figure 2B:
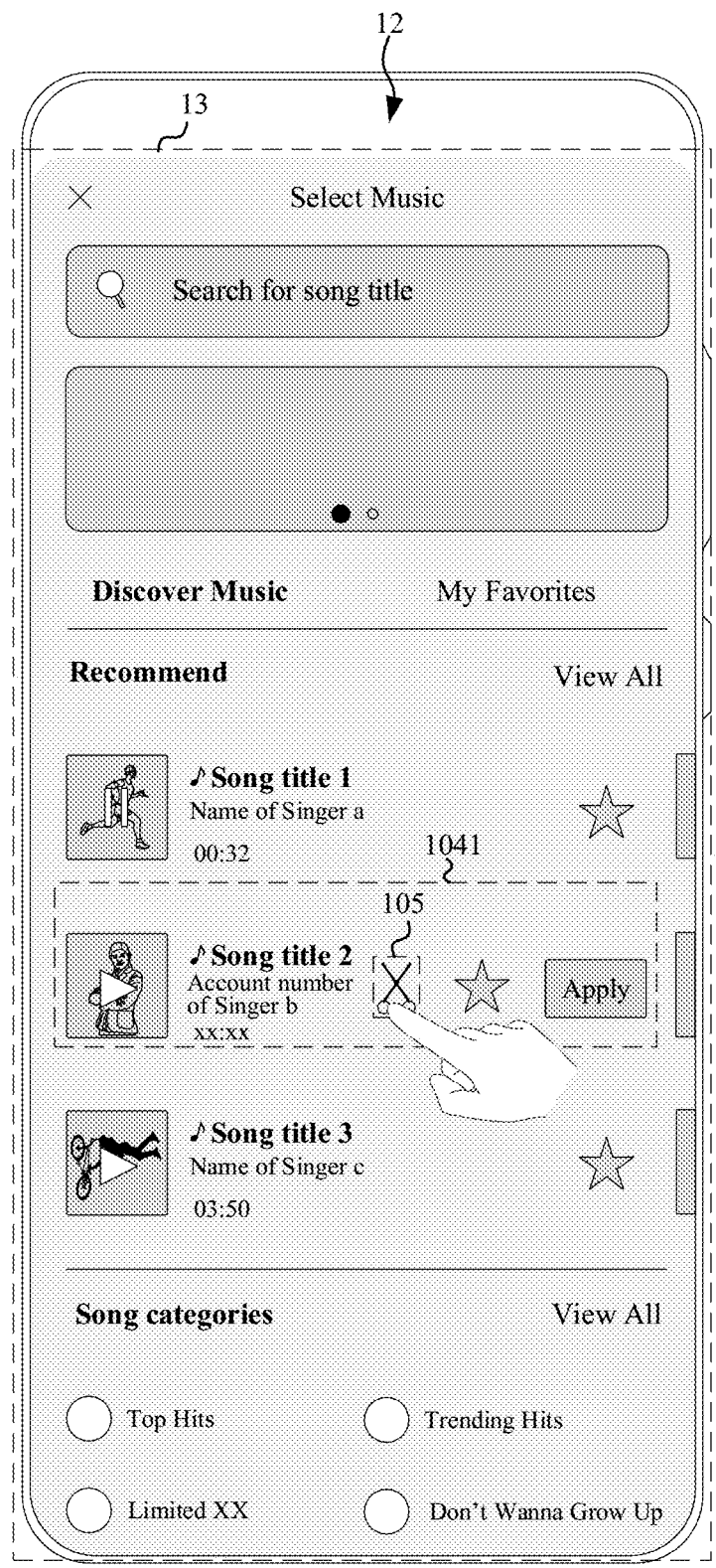

For example, after receiving a click operation performed by the user on the area 1041 shown in FIG. 2A, the application 1 may display a control 105 exemplarily shown in FIG. 2B in the area 1041. The control 105 is used to provide an entrance for editing the audio 1.

The play duration "xx:xx" of audio 1 is fixed, the capturing mode duration for capturing the video is fixed, and the licensed duration of audio 1 is also fixed. Thus, the application 1 may determine whether to play the audio 1 on a loop based on the values of the play duration of the audio 1, the licensed duration of the audio 1, and the capturing mode duration for capturing the video, to dynamically display the page for editing the audio 1.

Hereinafter, four cases are used to illustrate the page for editing the audio 1 in application 1.

In the first case, the play duration "xx:xx" of audio 1 is "00:42", and the play duration of audio 1 is less than the capturing mode duration for capturing the video of 60 s.

Figure 2C:
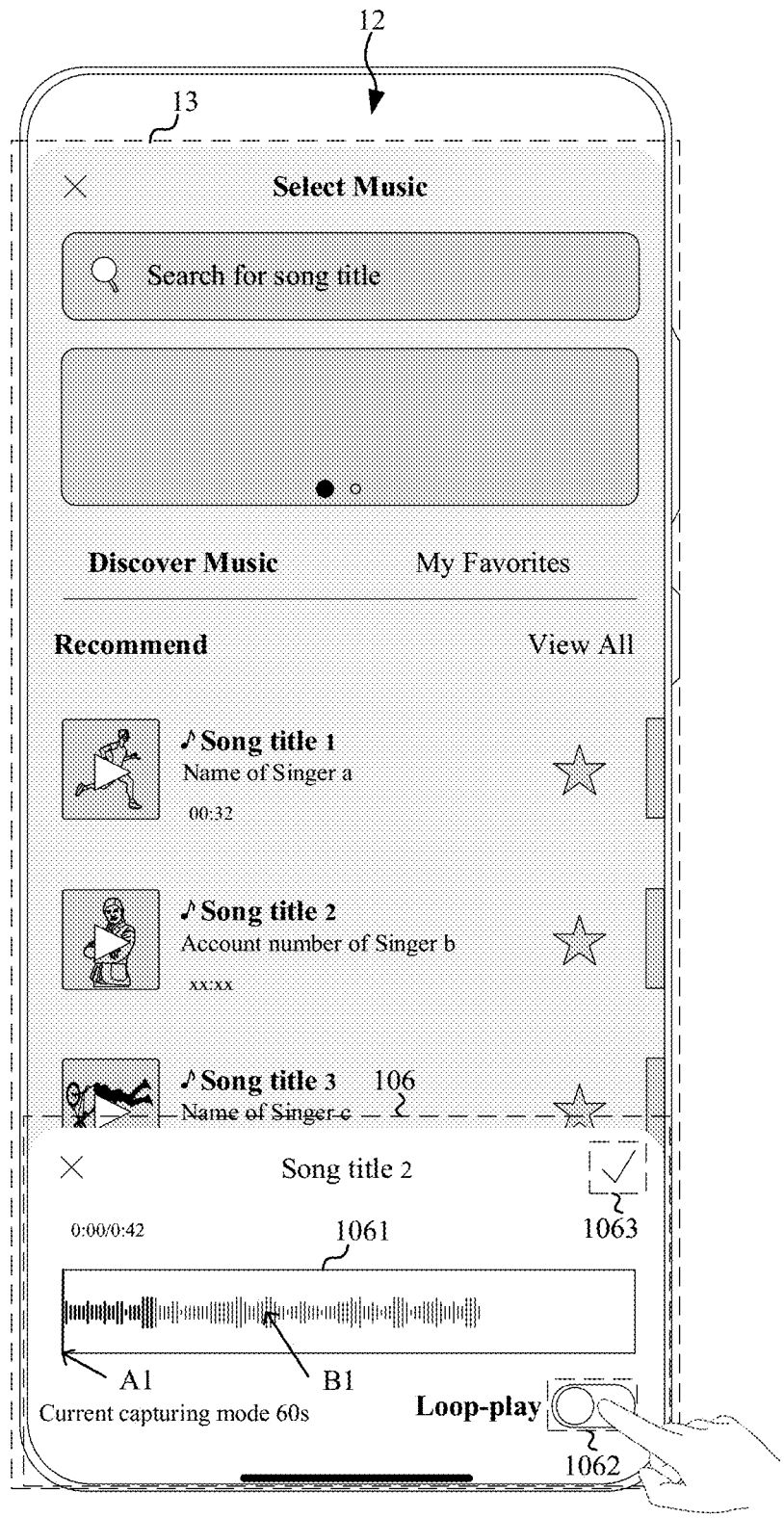

After receiving an operation performed by the user in the area 1041 shown in FIG. 2B, such as clicking on the control 105, the application 1 may display the window 106 on the page 13 exemplarily shown in FIG. 2C. The window 106 is used to present a page for editing the audio 1.

The window 106 may include: an area 1061, a control 1062 and a control 1063.

A position A1 and a waveform B1 are displayed in the area 1061. The position A1 is a starting play position of the audio 1. The waveform B1 is an entire music waveform of the audio 1.

The control 1062 is in a first state, which is used to control the audio 1 to be not played on a loop while playing the video.

The control 1063 is used to confirm the selected audio.

Figure 2D:
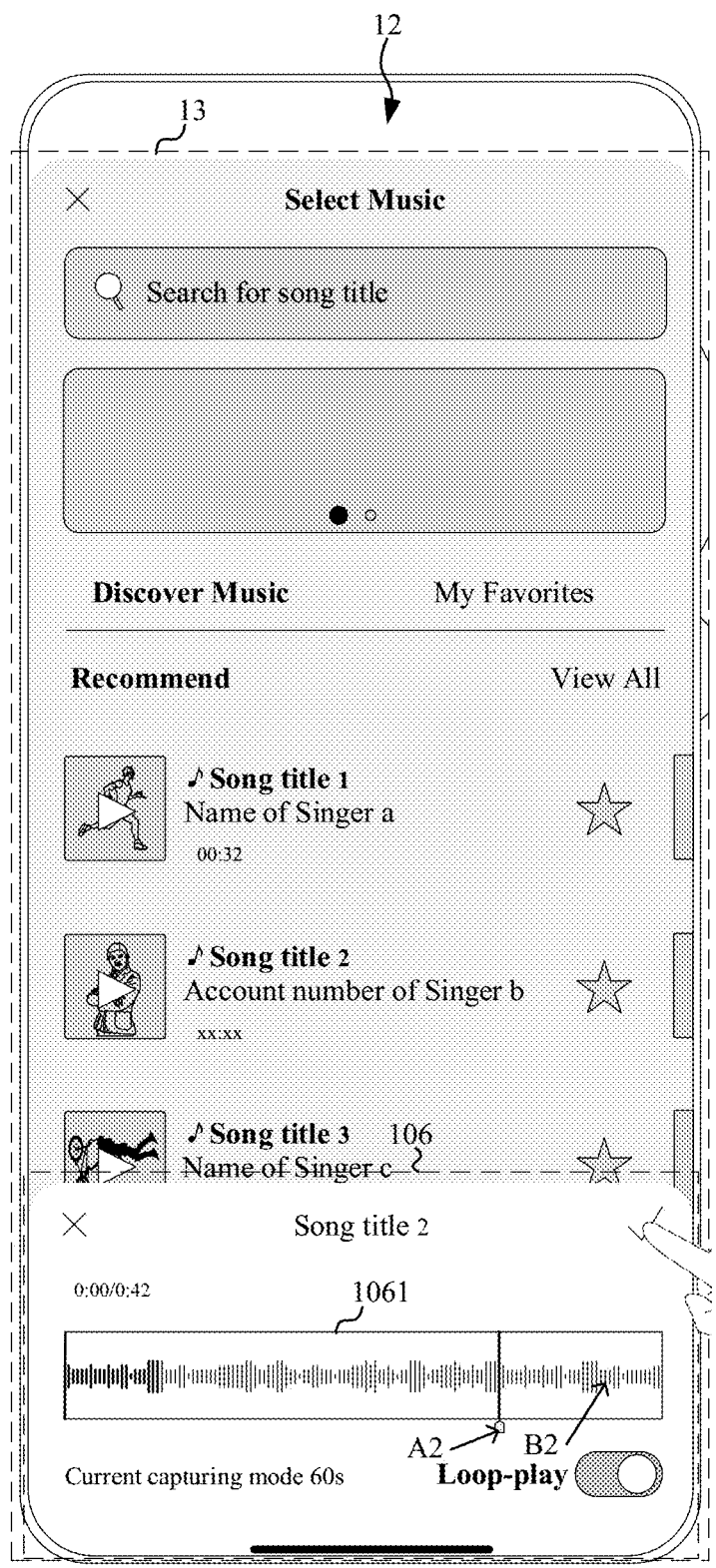

After receiving an operation performed by the user in the window 106 shown in FIG. 2C, such as switching the state of the control 1062, the application 1 may display the updated control 1062 and area 1061 exemplarily shown in FIG. 2D, on the window 106.

The control 1062 is in the second state, which is used to control the audio 1 to be played on a loop while playing the video. In addition to the position A1 and the waveform B1, the position A2 and the waveform B2 are further displayed in the updated area 1061. The position A2 is a starting loop position of the audio 1, and the waveform B2 is a loop waveform of the audio 1.

Figure 2E:
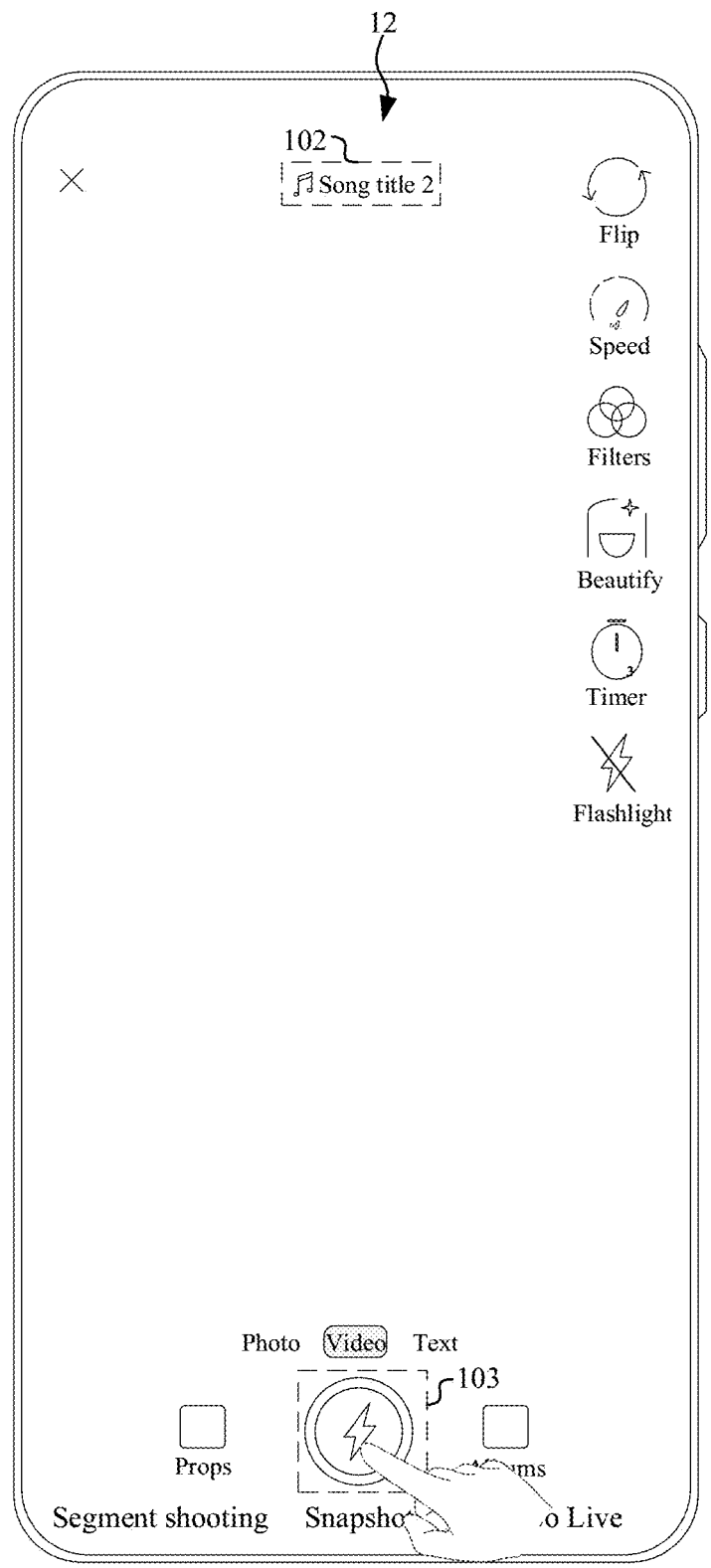

After receiving the operation performed by the user in the window 106 shown in FIG. 2D, such as clicking on the control 1063, application 1 may display the user interface 12 exemplarily shown in FIG. 2E on the mobile phone. The title of the selected audio 1 is displayed in the control 102, for example, the song title 2.

It should be noted that, when the user does not want to loop the audio 1, application 1 may receive the operation performed by the user in window 106 shown in FIG. 2D, such as switching the state of control 1062, and then the application 1 may display the first state of the control 1062 and the area 1061 exemplarily shown in FIG. 2C on the window 106. Thus, the area 1061 in the window 106 and the control 1062 in different states can be switched between FIG. 2C and FIG. 2D, so as to satisfy the intention of the user.

In the second case, the play duration "xx:xx" of audio 1 is "00:42", the play duration of audio 1 is less than the capturing mode duration for capturing the video of 60 s, and the licensed duration of audio 1 of 15 s is less than the play duration of audio 1.

Figure 2F:
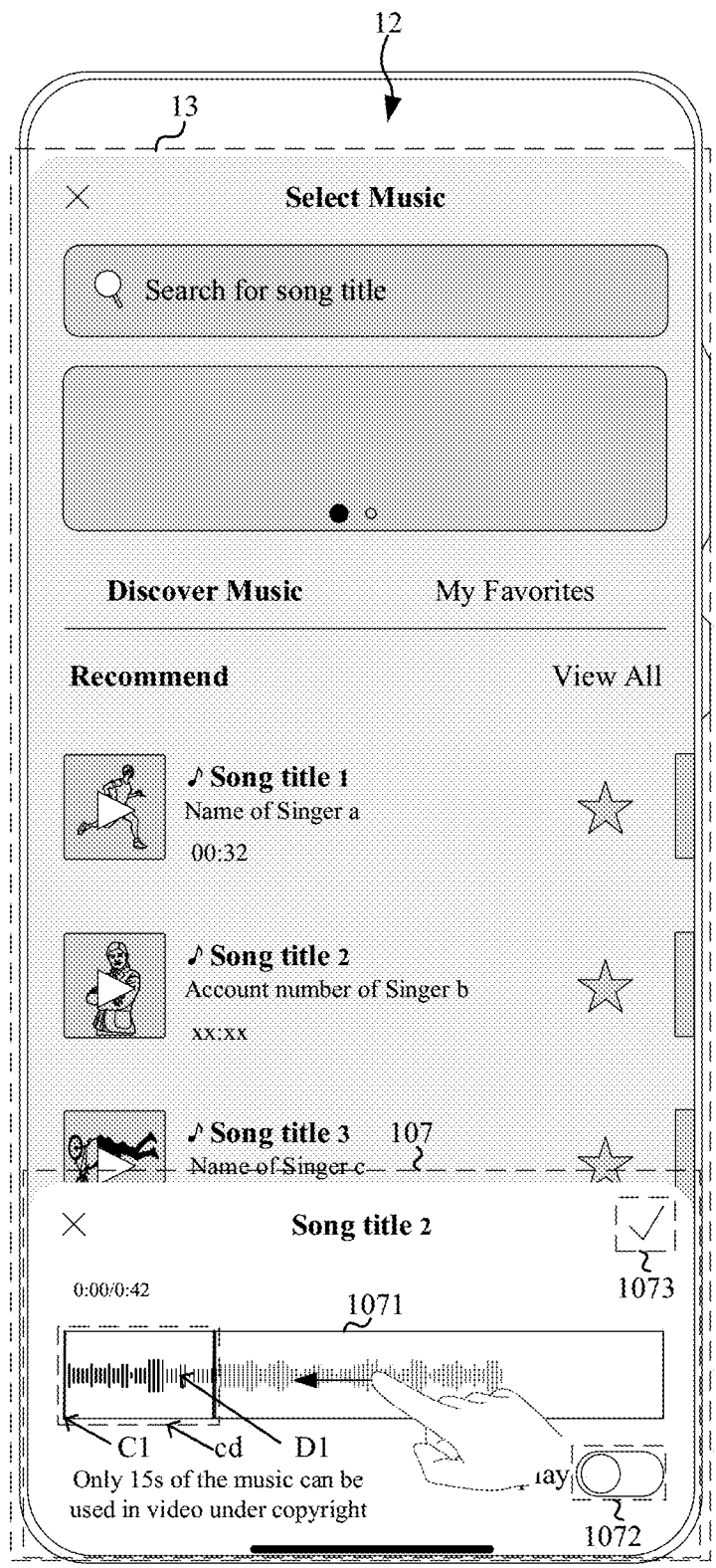

After receiving an operation performed by the user in the area 1041 shown in FIG. 2B, such as clicking on the control 105, application 1 may display a window 107 exemplarily shown in FIG. 2F on the page 13. The window 107 is used to present the page of editing the audio 1.

The window 107 may include: an area 1071, a control 1072 and a control 1073.

A position C1, a small window cd and the entire music waveform of audio 1 are displayed in the area 1071. The position C1 is the starting play position of the audio 1, and small window cd is used to display the music waveform D1 of audio 1 within the licensed duration of audio 1.

The control 1072 is in the first state, which is used to control the audio 1 to be not played on a loop while playing the video.

The control 1073 is used to confirm the selected audio.

Figure 2G:

After receiving an operation performed by the user in the window 107 shown in FIG. 2F, such as dragging the music waveform of the audio 1, the application 1 may display the updated area 1071 exemplarily shown in FIG. 2G on the window 107.

In addition to the position C1, an updated small window cd is further displayed in the updated area 1071. The updated small window cd is used to display a waveform D2 of an audio with the licensed duration selected by the user from the music waveform of audio 1.

Figure 2H:
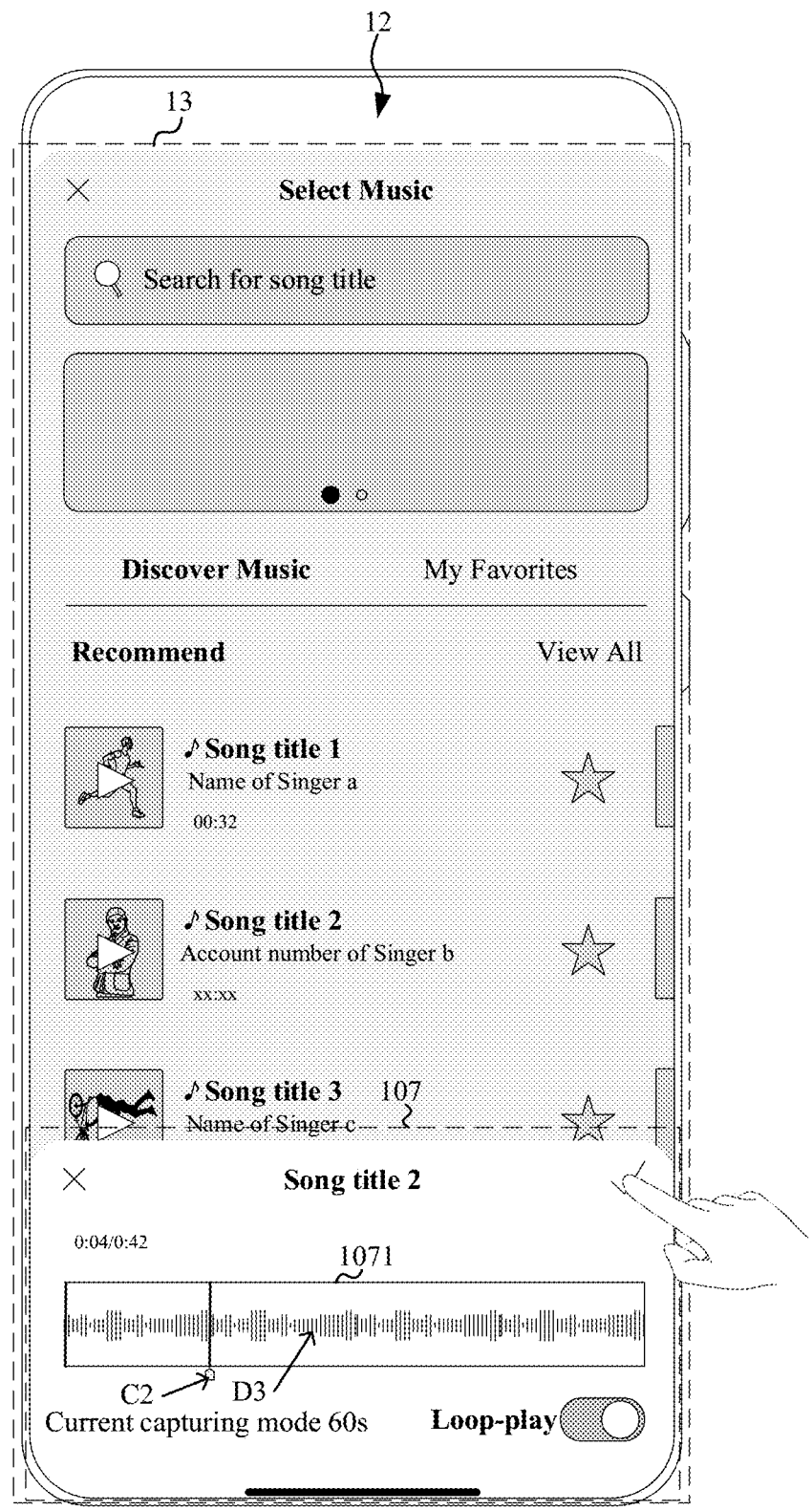

After receiving an operation performed by the user in the window 107 shown in FIG. 2G, such as switching the state of the control 1072, the application 1 may display the updated control 1072 and the updated area 1071 exemplarily shown in FIG. 2H on the window 107.

The control 1072 is in the second state, which is used to control the audio 1 to be played on a loop while playing the video. In addition to the position C1 and the waveform D2, the position C2 and the waveform D3 are displayed in the updated area 1071. The position C2 is a starting loop position of the audio 1, and the waveform D3 is a loop waveform of the audio 1 obtained by looping the waveform D2.

After receiving an operation performed by the user in the window 107 shown in FIG. 2H, such as clicking the control 1073, the application 1 may display user interface 12 exemplarily shown in FIG. 2E on the mobile phone. The title of the selected audio 1, such as, song title 2, is displayed at the control 102 on the user interface 12.

It should be noted that, when the user does not want to loop the audio 1, after receiving an operation performed by the user in window 107 shown in FIG. 2H, such as switching the state of control 1072, the application 1 may display the first state of the control 1072 and the area 1071 exemplarily shown in FIG. 2G on the window 107. Thus, the area 1071 and the control 1072 in different states in the window 107 can be switched between FIG. 2G and FIG. 2H, so as to satisfy the intention of the user.

In addition, after the control 1072 is in the second state, the user cannot replace the selected waveform D2 by the operation of moving the music waveform of audio 1 in the area 1071.

In the third case, the play duration "xx:xx" of audio 1 is "02:56", the play duration of audio 1 is greater than the capturing mode duration for capturing the video of 60 s, and the licensed duration of audio 1 of 15 s is less than the capturing mode duration for capturing the video of 60 s.

Figure 2I:
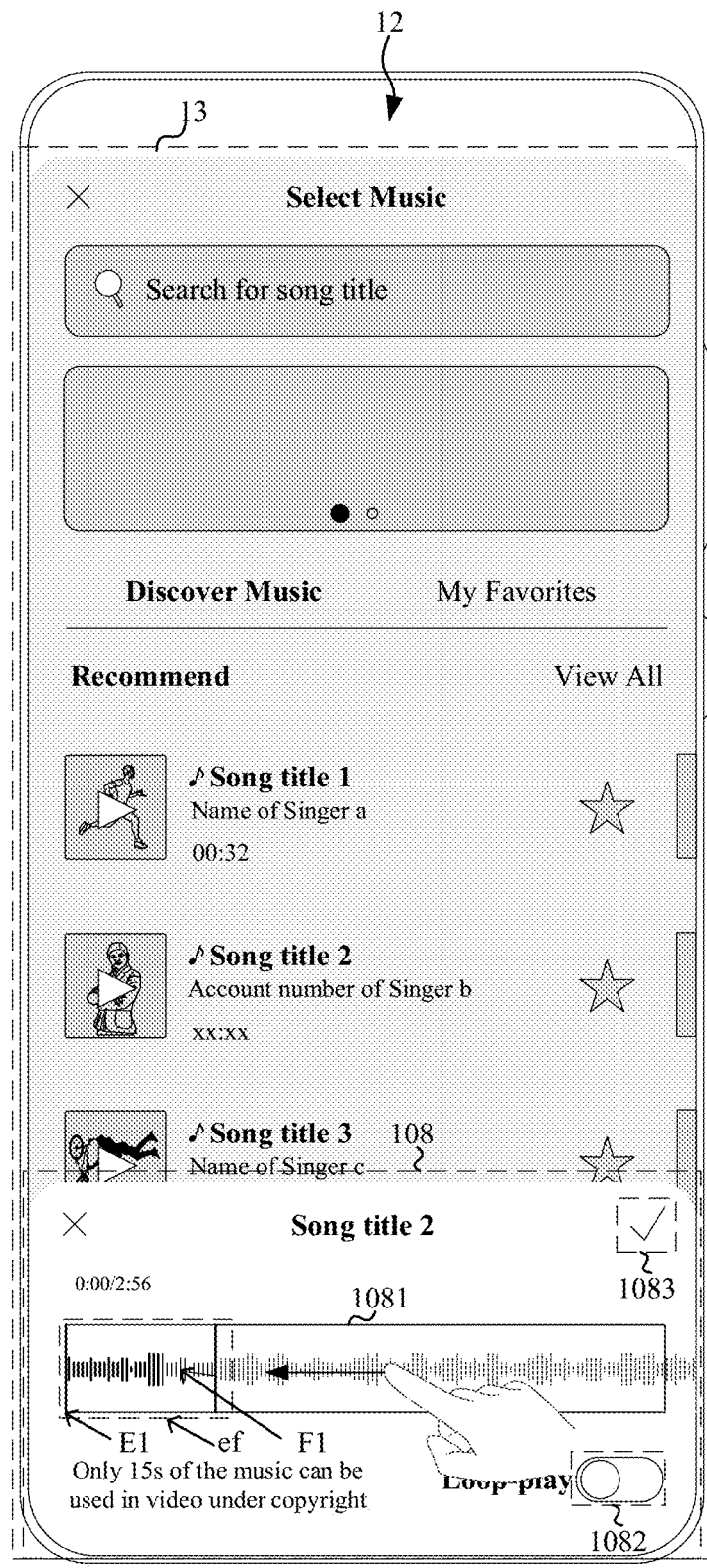

After receiving an operation performed by the user in the area 1041 shown in FIG. 2B, such as clicking on the control 105, the application 1 may display the window 108 exemplarily shown in FIG. 2I on the page 13. The window 108 is used to present the page for editing the audio 1.

The window 108 may include: an area 1081, a control 1082 and a control 1083.

A position E1, a small window ef and a partial music waveform of audio 1 are displayed in the area 1081. The position E1 is a starting play position of the audio 1, and small window ef is used to present the music waveform F1 of the audio 1 within the licensed duration of the audio 1.

The control 1082 is in the first state, which is used to control the audio 1 to be not played on a loop while playing the video.

The control 1083 is used to confirm the selected audio.

Figure 2J:

After receiving an operation performed by the user in the window 108 shown in FIG. 2I, such as dragging a partial music waveform of the audio 1, the application 1 may display the updated area 1081 exemplarily shown in FIG. 2J on the window 108.

In addition to the position E1, the updated partial music waveform of the audio 1 and the updated small window ef are further displayed in the updated area 1081. The updated small window ef is used to display a waveform F2 of the audio with the licensed duration selected from the updated partial music waveform of the audio 1.

Figure 2K:
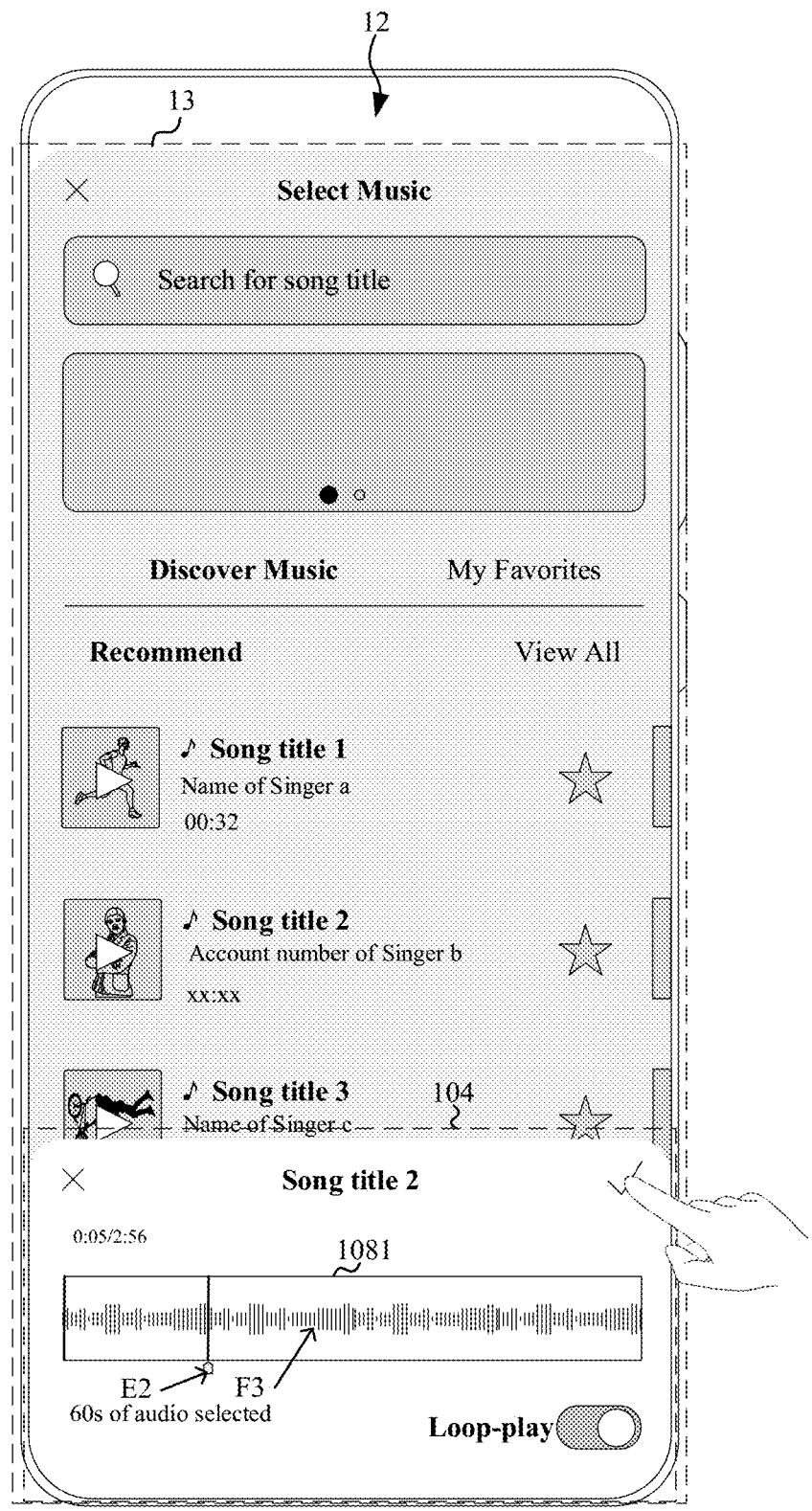

After receiving an operation performed by the user in the window 108 shown in FIG. 2J, such as switching the state of the control 1082, the application 1 may display the updated area 1081 and the control 1082 exemplarily shown in FIG. 2K on the window 108.

The control 1082 is in the second state, which is used to control the audio 1 to be played on a loop while playing the video. In addition to the position E1 and the waveform F2, the position E2 and the waveform F3 are further displayed in the updated area 1081. The position E2 is a starting loop position of the audio 1, and the waveform F3 is a loop waveform of the audio 1 obtained by looping the waveform F2.

After receiving an operation performed by the user in window 108 shown in FIG. 2K, such as clicking on the control 1083, the application 1 may display user interface 12 exemplarily shown in FIG. 2E on the mobile phone. The title of the selected audio 1, such as, song title 2, is displayed at the control 102 on the user interface 12.

It should be noted that, when the user does not want to loop the audio 1, after receiving an operation performed by the user in window 108 shown in FIG. 2K, such as switching the state of control 1082, the application 1 may display the first state of the control 1082 and the area 1081 exemplarily shown in FIG. 2J on the window 108. Thus, the area 1082 in the window 108 and the control 1082 in different states can be switched between FIG. 2J and FIG. 2K, so as to satisfy the intention of the user.

In addition, after the control 1082 is in the second state, the user cannot replace the selected waveform F2 by an operation of moving the music waveform of audio 1 in the area 1081.

In a fourth case, the play duration "xx:xx" of audio 1 is "02:56", the play duration of audio 1 is greater than the capturing mode duration for capturing the video of 60 s.

Figure 2L:
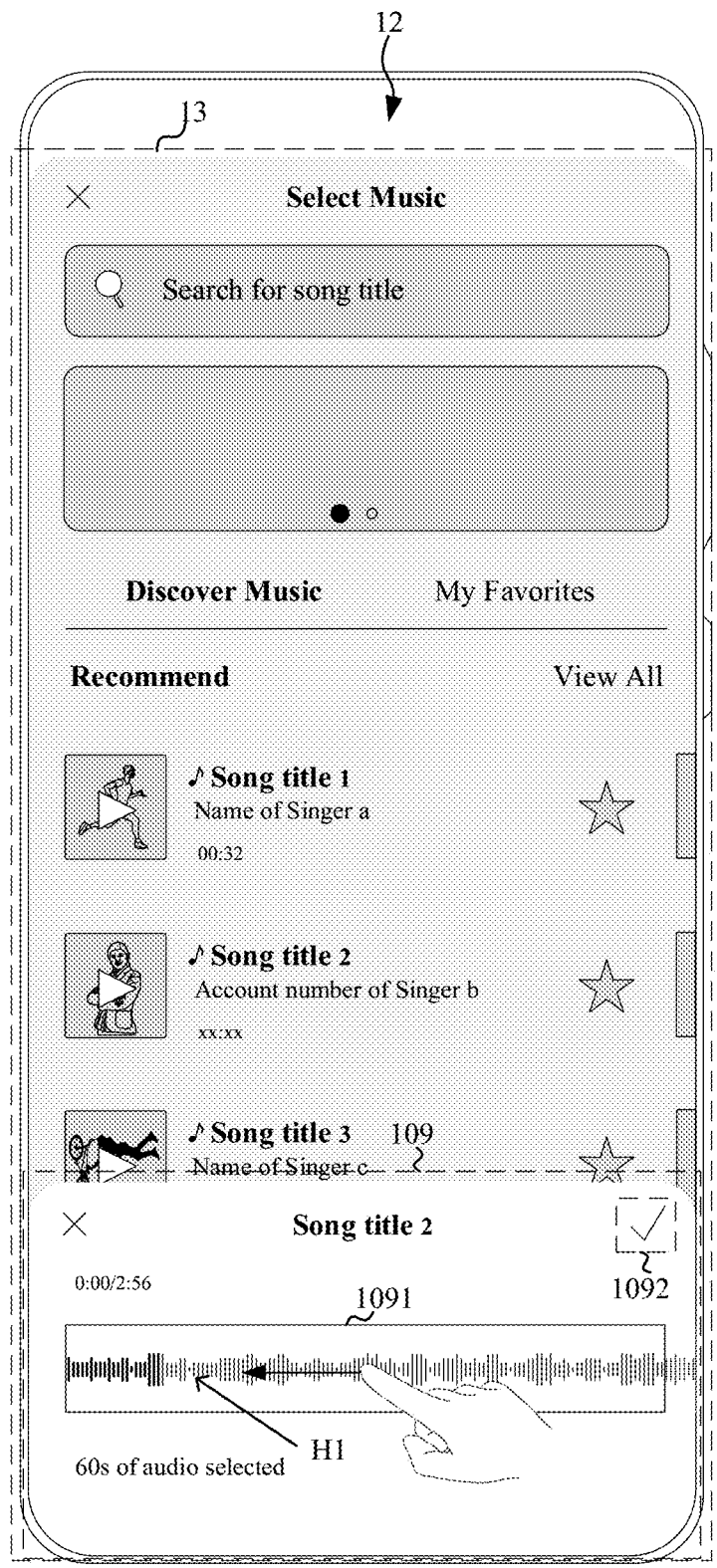

After receiving an operation performed by the user in area 1041 shown in FIG. 2B, such as clicking on the control 105, the application 1 may display a window 109 exemplarily shown in FIG. 2L on the page 13. The window 109 is used to present the page for editing the audio 1.

The window 109 may include: an area 1091 and a control 1092.

The waveform H1 is displayed in the area 1091, and the waveform H1 is a partial music waveform of the audio 1.

The control 1092 is used to confirm the selected audio.

Figure 2M:
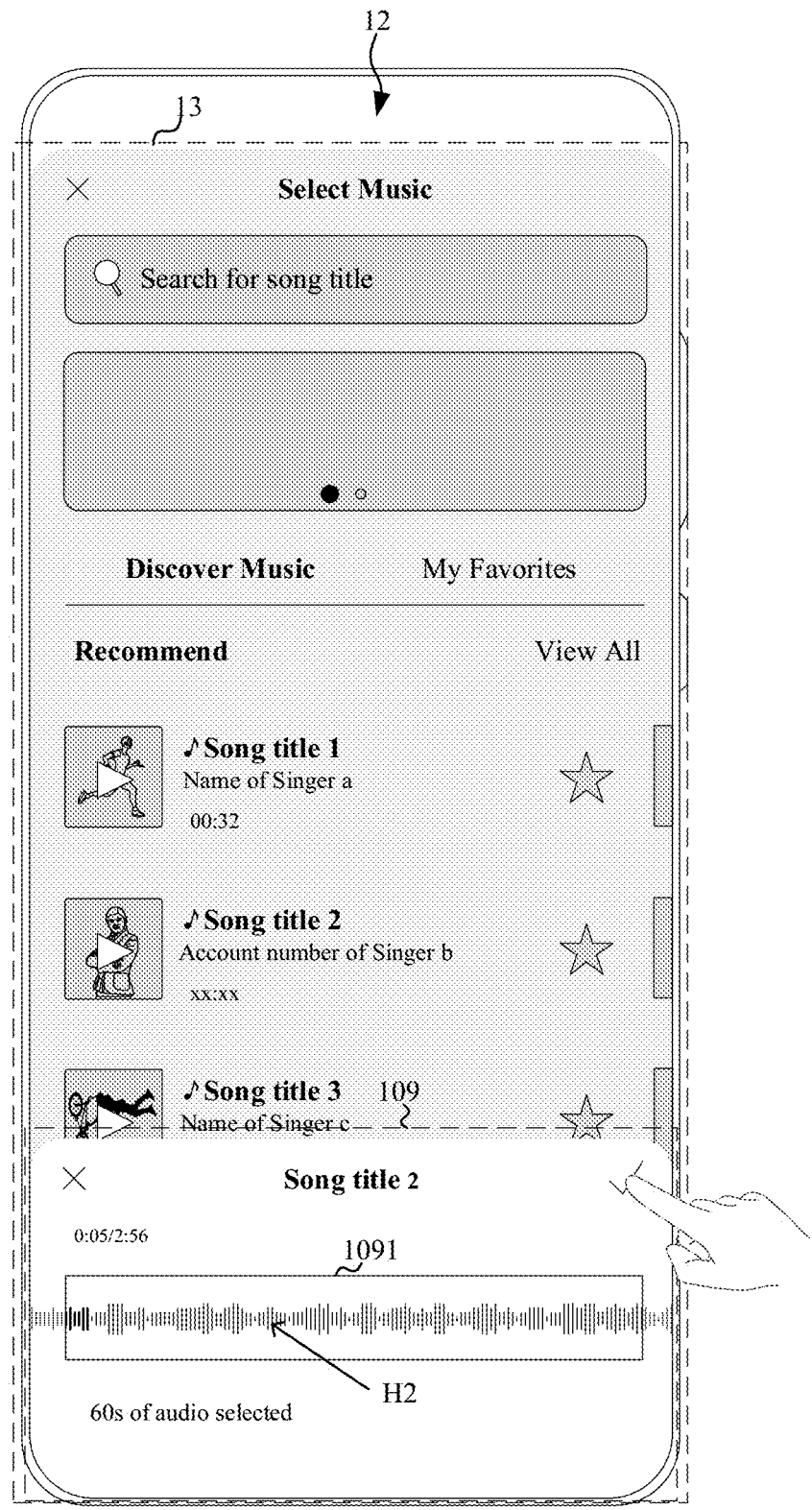

After receiving an operation performed by the user in the window 109 shown in FIG. 2L, such as dragging a partial music waveform of the audio 1, the application 1 may display the updated area 1091 exemplarily shown in FIG. 2M on the window 109. The waveform H2 is displayed in the updated area 1091. The waveform H2 is the updated partial music waveform of the audio 1.

After receiving an operation performed by the user in window 109 shown in FIG. 2M, such as clicking on the control 1092, application 1 may display the updated user interface 12 exemplarily shown in FIG. 2E on the mobile phone. The title of the selected audio 1, such as, song title 2, is displayed at the control 102 on the user interface 12.

It should be noted that before the operation such as clicking on the control 1092 in FIG. 2M, the user may replace the selected waveform H2 by an operation of moving the music waveform of audio 1 in the area 1091.

Furthermore, after receiving an operation for capturing an video performed by the user on the updated user interface 12 shown in FIG. 2E, the application 1 may capture the video 1 and post it on the application 1, to enable the users of the application 1 to view. In this way, when the user wants to play the video 1, in the process of playing the video 1, the user may select whether the audio 1 is displayed on a loop or not on a loop based on the display and state of the control for playing the audio 1 on a loop in the case 1, case 2, case 3 and case 4.

In addition, the application 1 receives an operation performed by the user on the page 13 shown in FIGS. 2A to 2M, such as, selecting an area (e.g., the area 1042 corresponding to the audio 2) corresponding to the other audio except the audio 1. Then, the application 1 may determine whether to play the audio 2 on a loop based on the values of the play duration of the audio 2, the licensed duration of the audio 2, and the capturing mode duration for capturing the video, to dynamically display the page for editing the audio 2. The specific implementation processes may refer to the description of the page for editing the audio 1 in the case 1, the case 2, the case 3 and the case 4, which will not be repeated here.

The area 1042 corresponding to the audio 2 is used to display relevant information of an audio 2, such as a song title 1, an account number of the singer a, a cover of the audio 2, and play duration of the audio 2, e.g., 32 seconds. In addition, the area 1042 provides an entrance for editing the audio 2.

Second Scenario

Figure 3A:
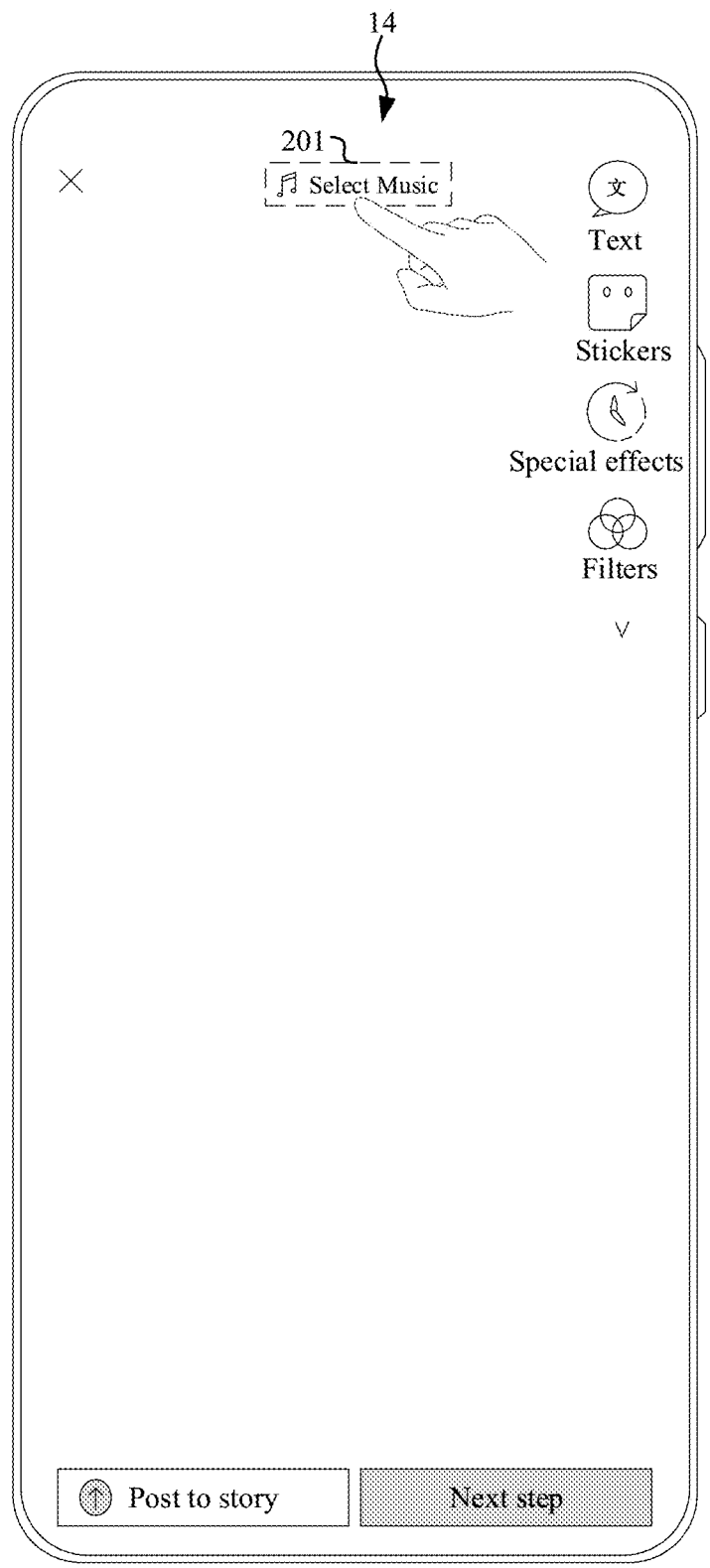
FIG. 3A to 3O are schematic diagrams of human-computer interaction interfaces according to an embodiment of the present disclosure.
Figure 3B:
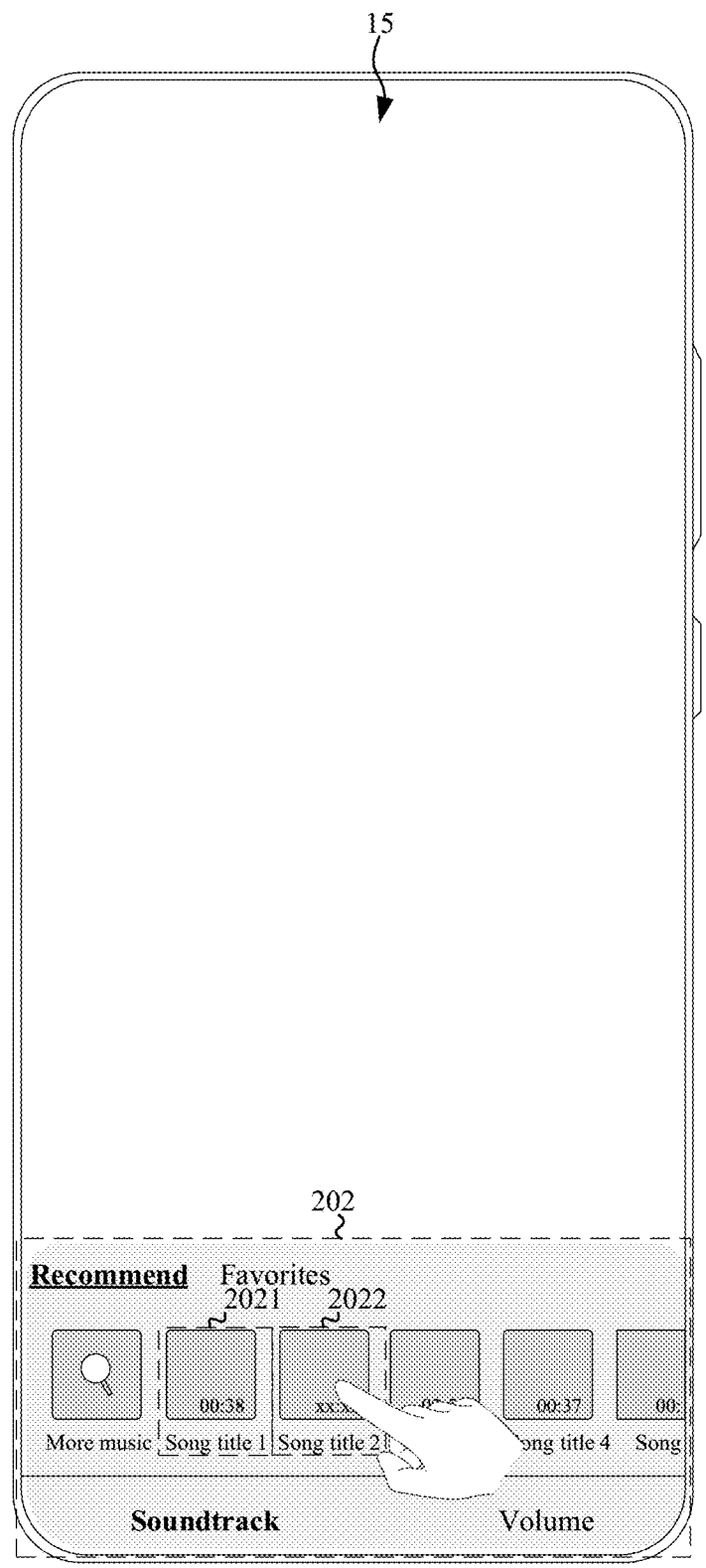
Figure 3C:
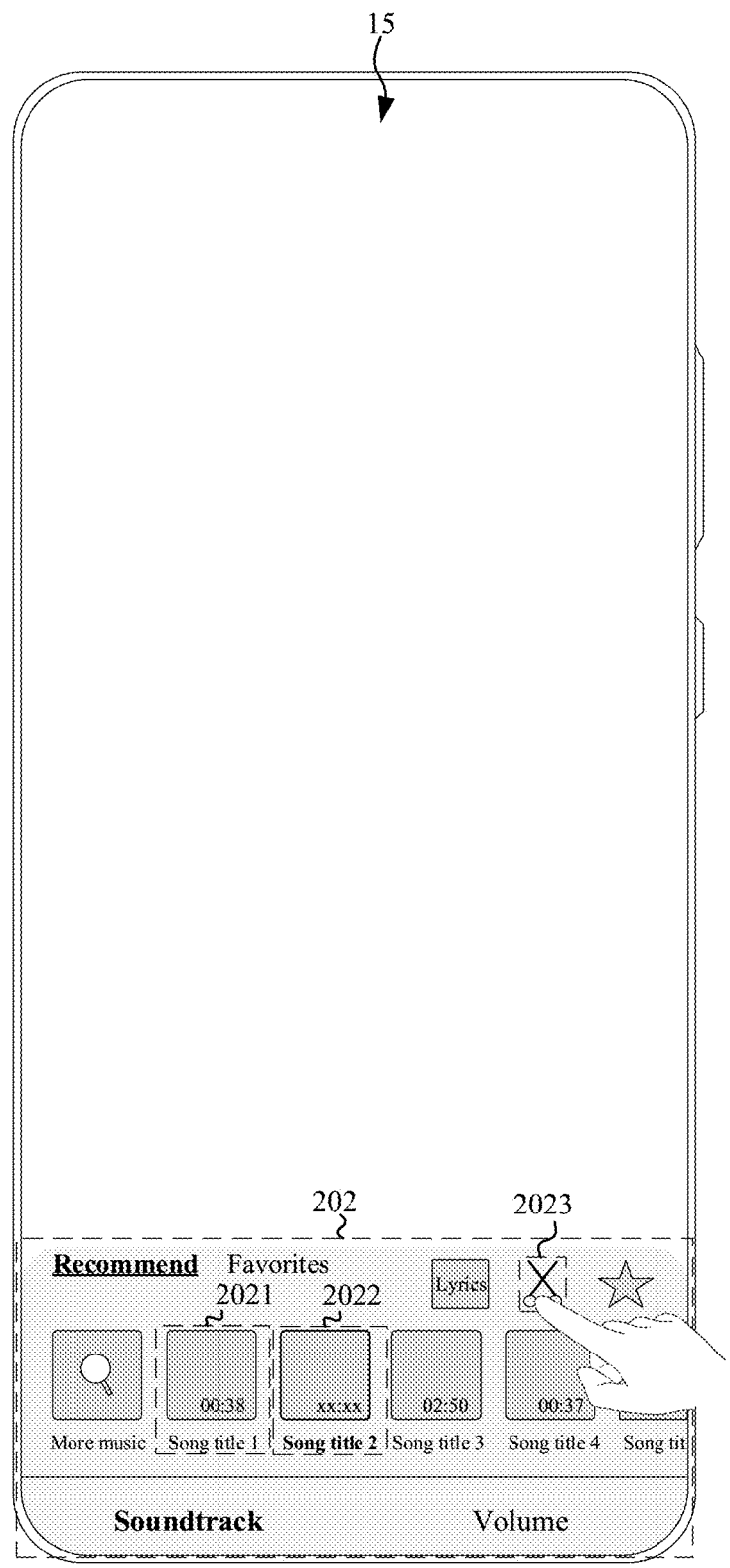
Figure 3D:
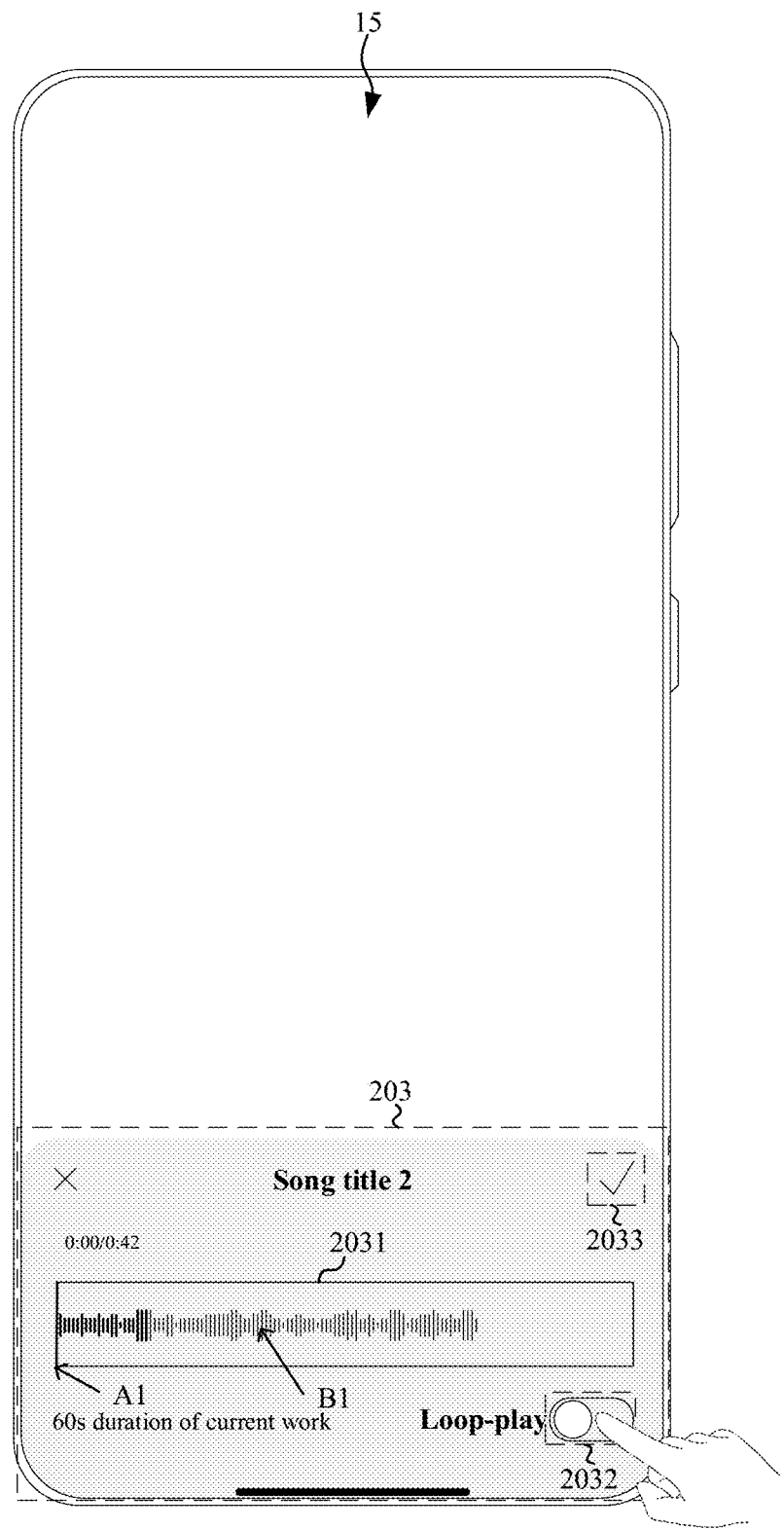
Figure 3E:
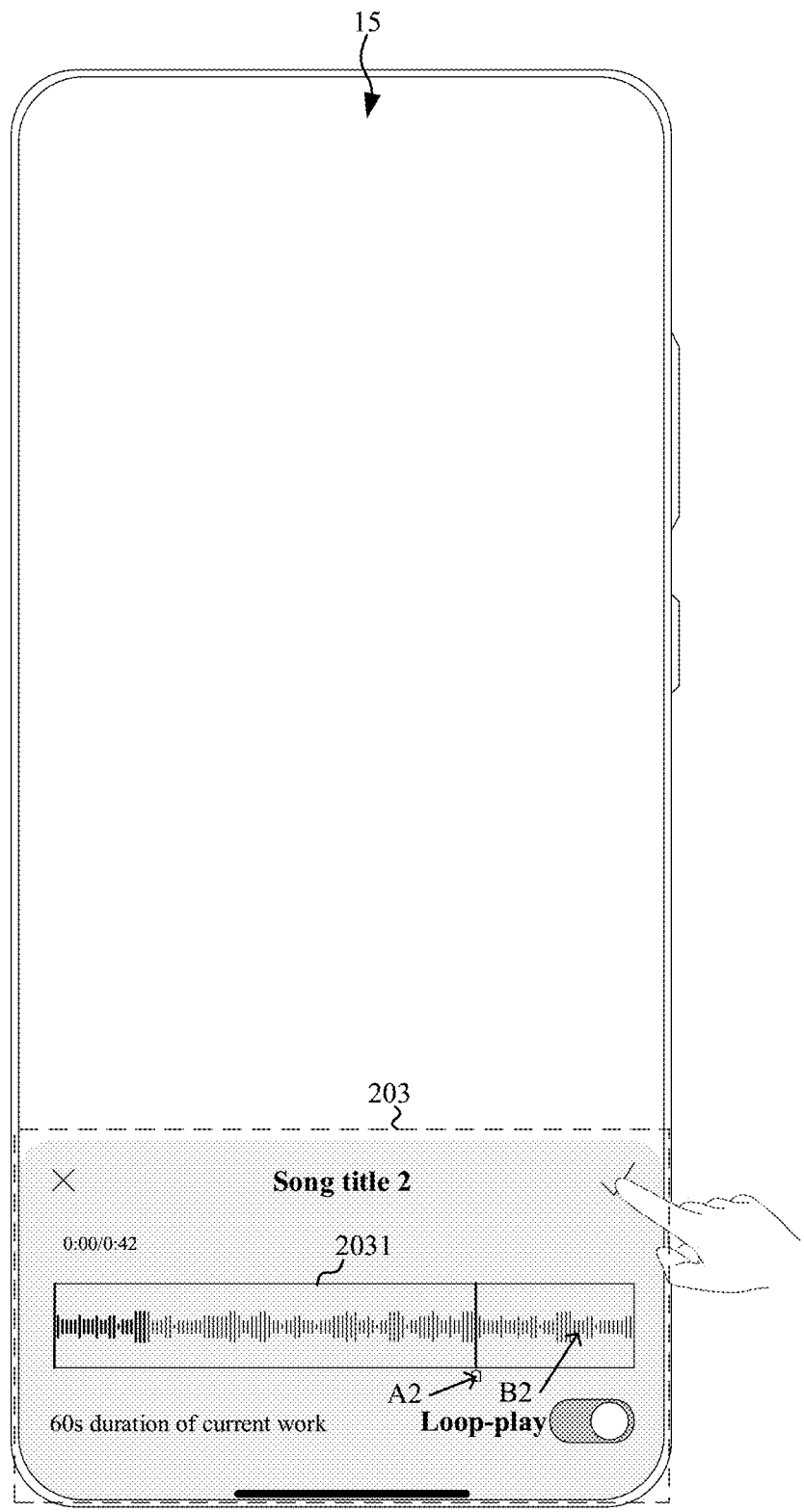
Figure 3F:
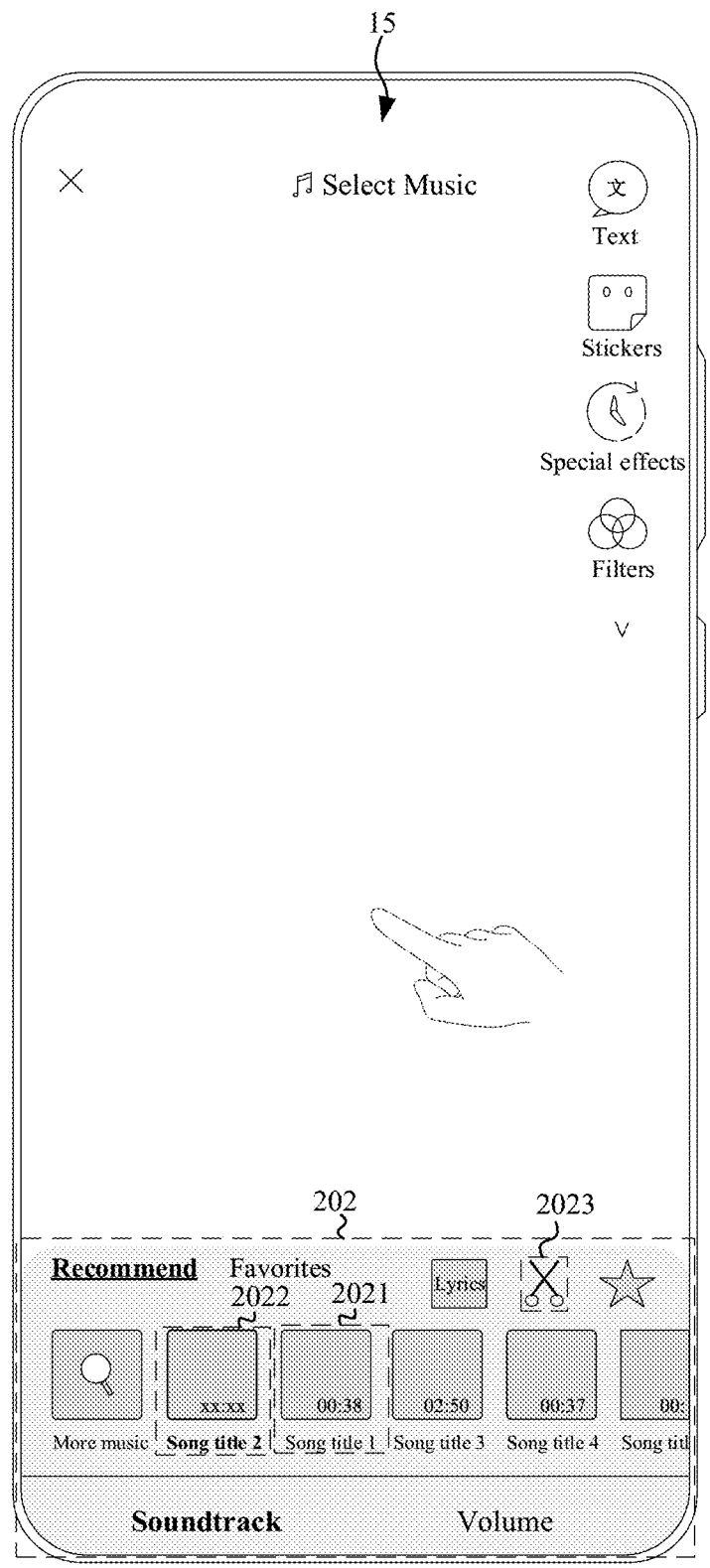
Figure 3G:
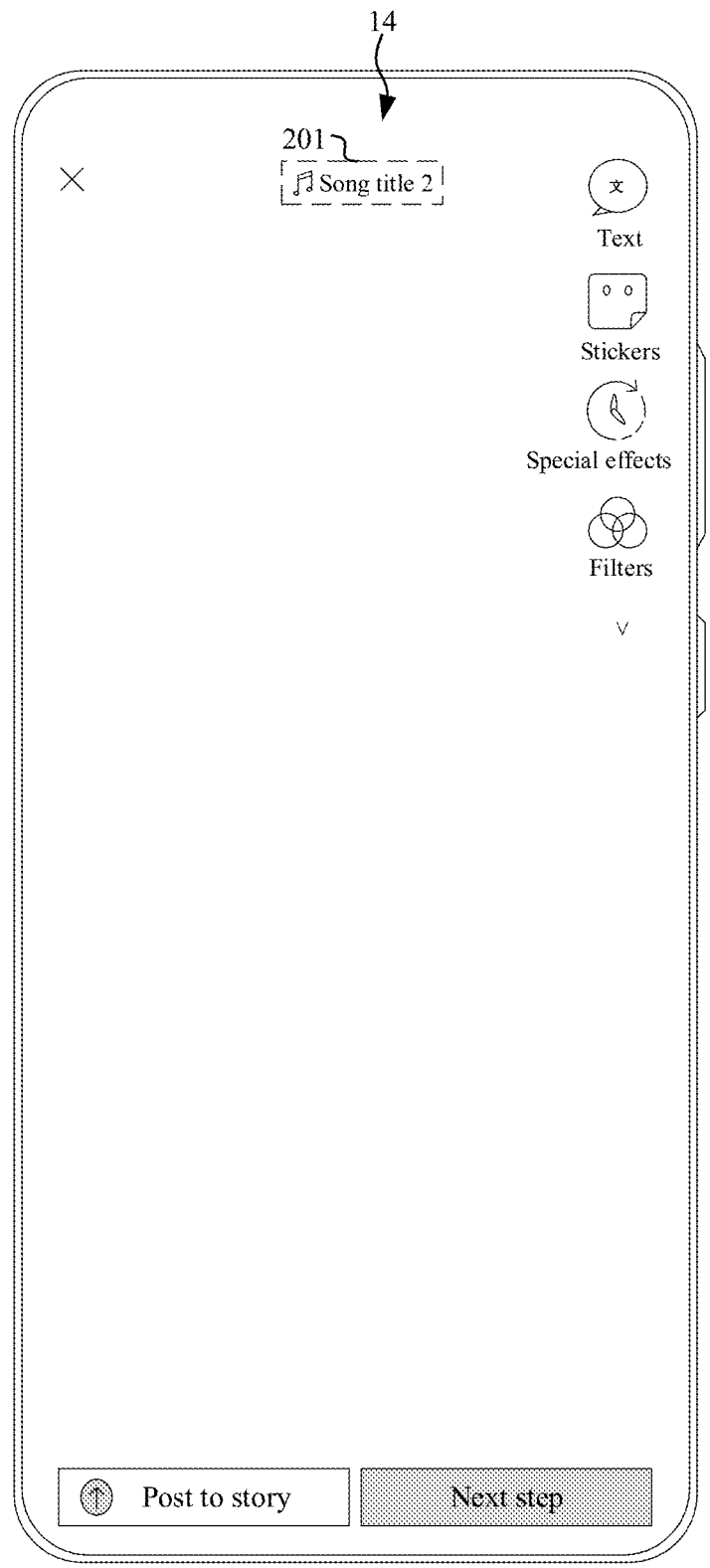
Figure 3H:
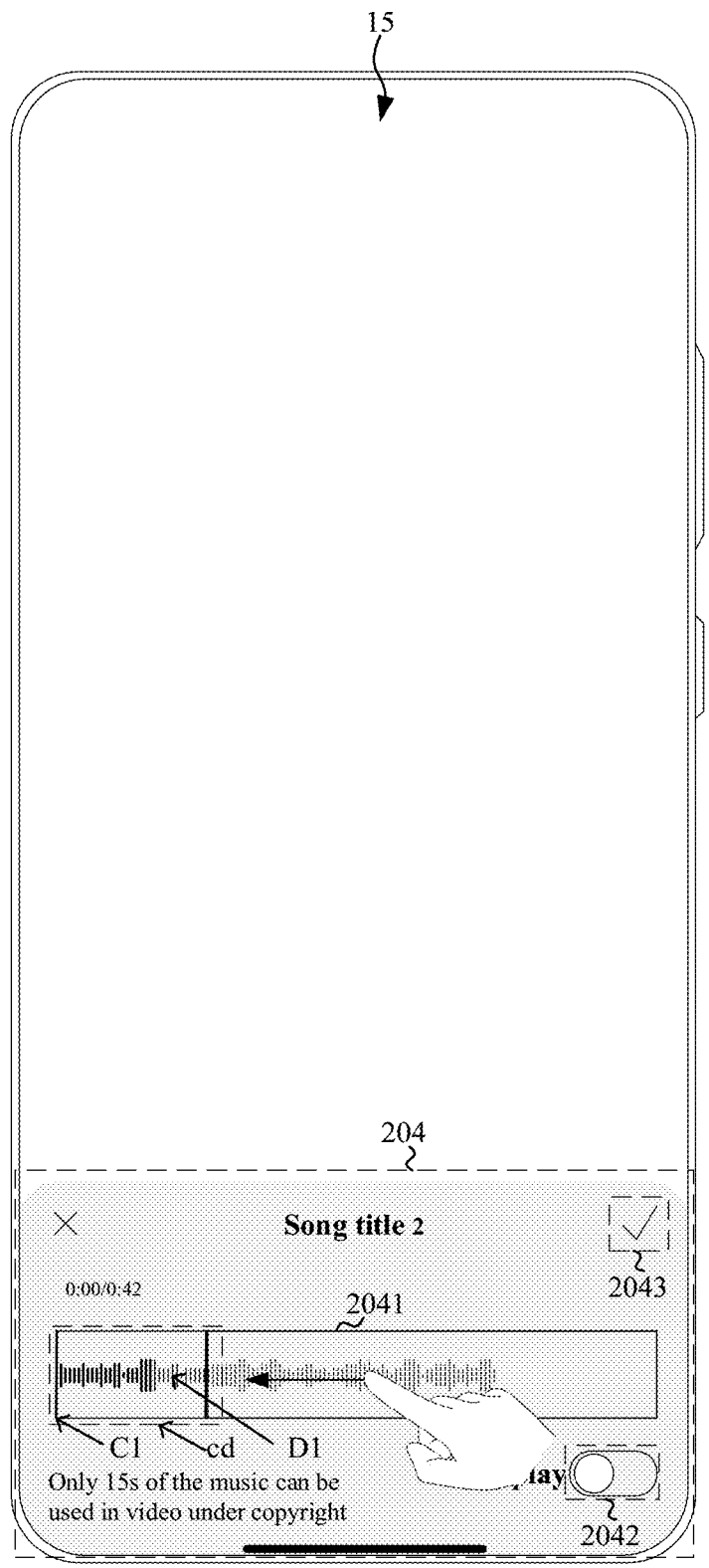
Figure 3I:
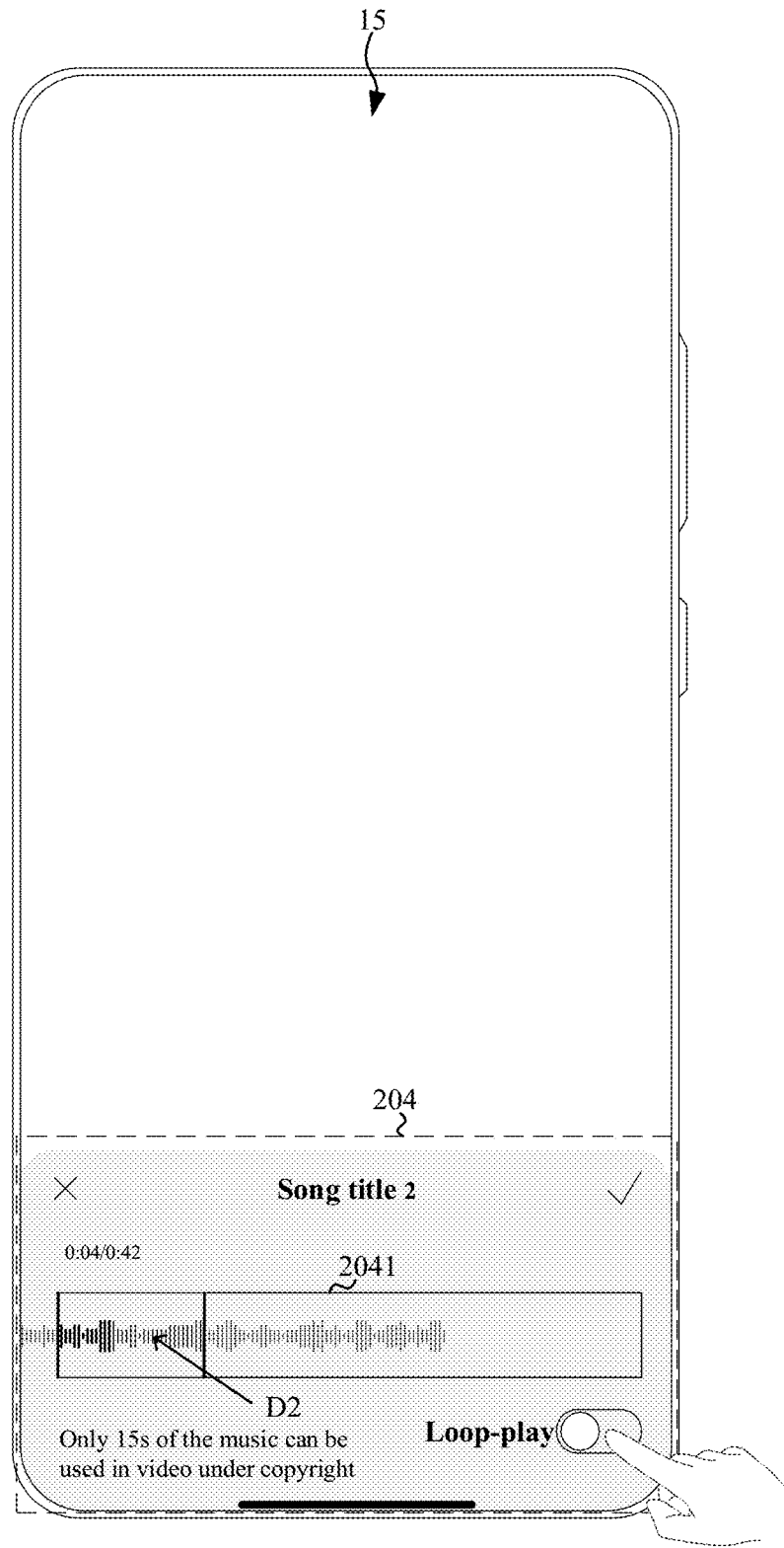
Figure 3J:
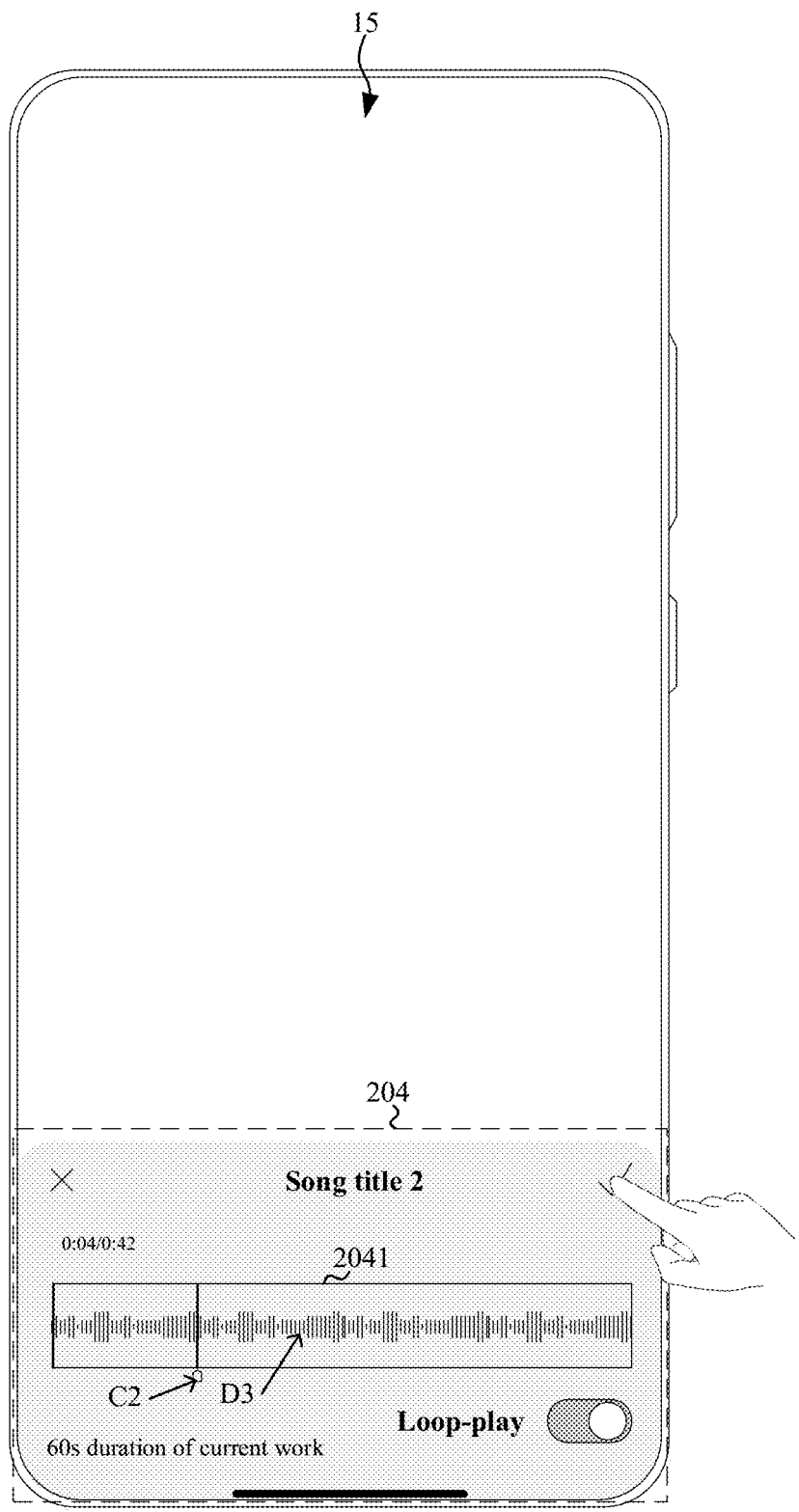
Figure 3K:
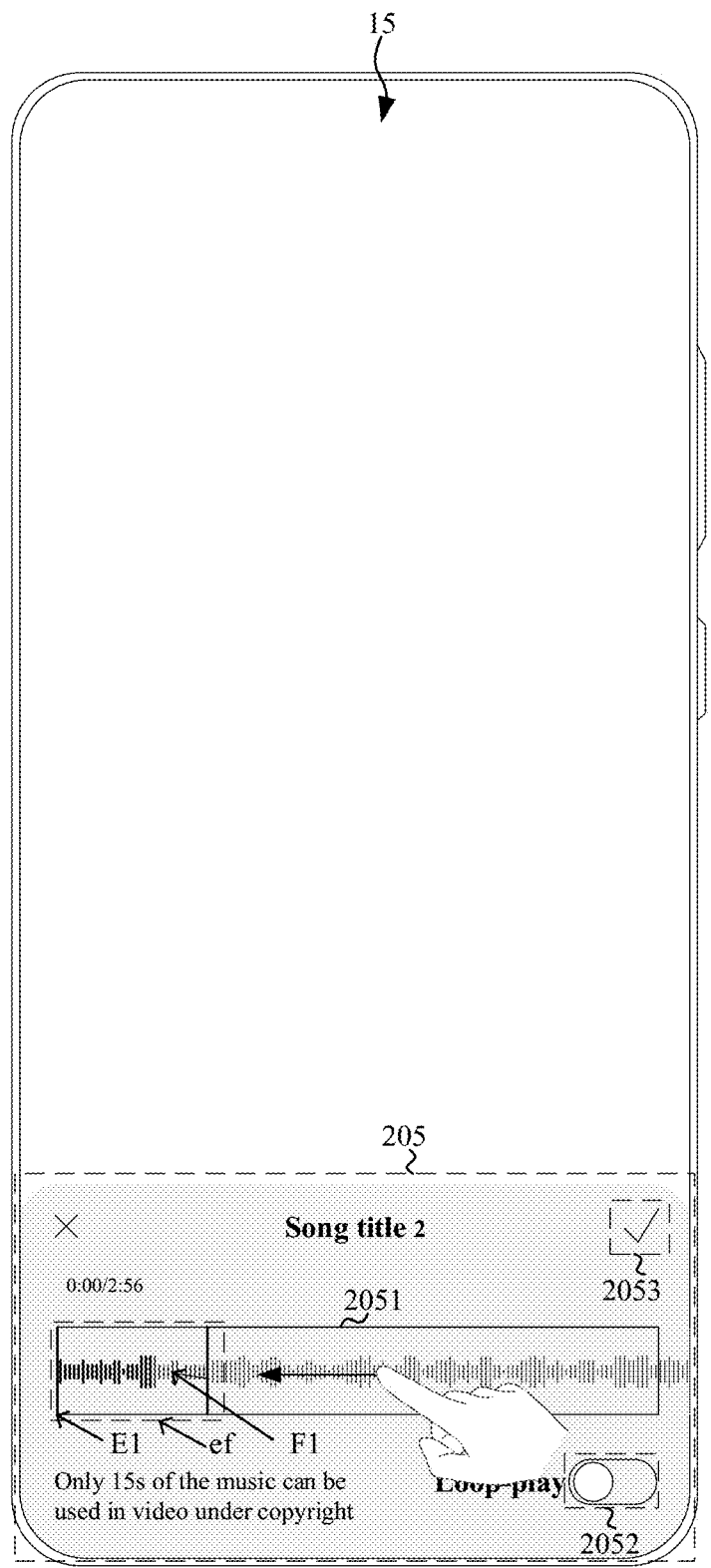
Figure 3L:
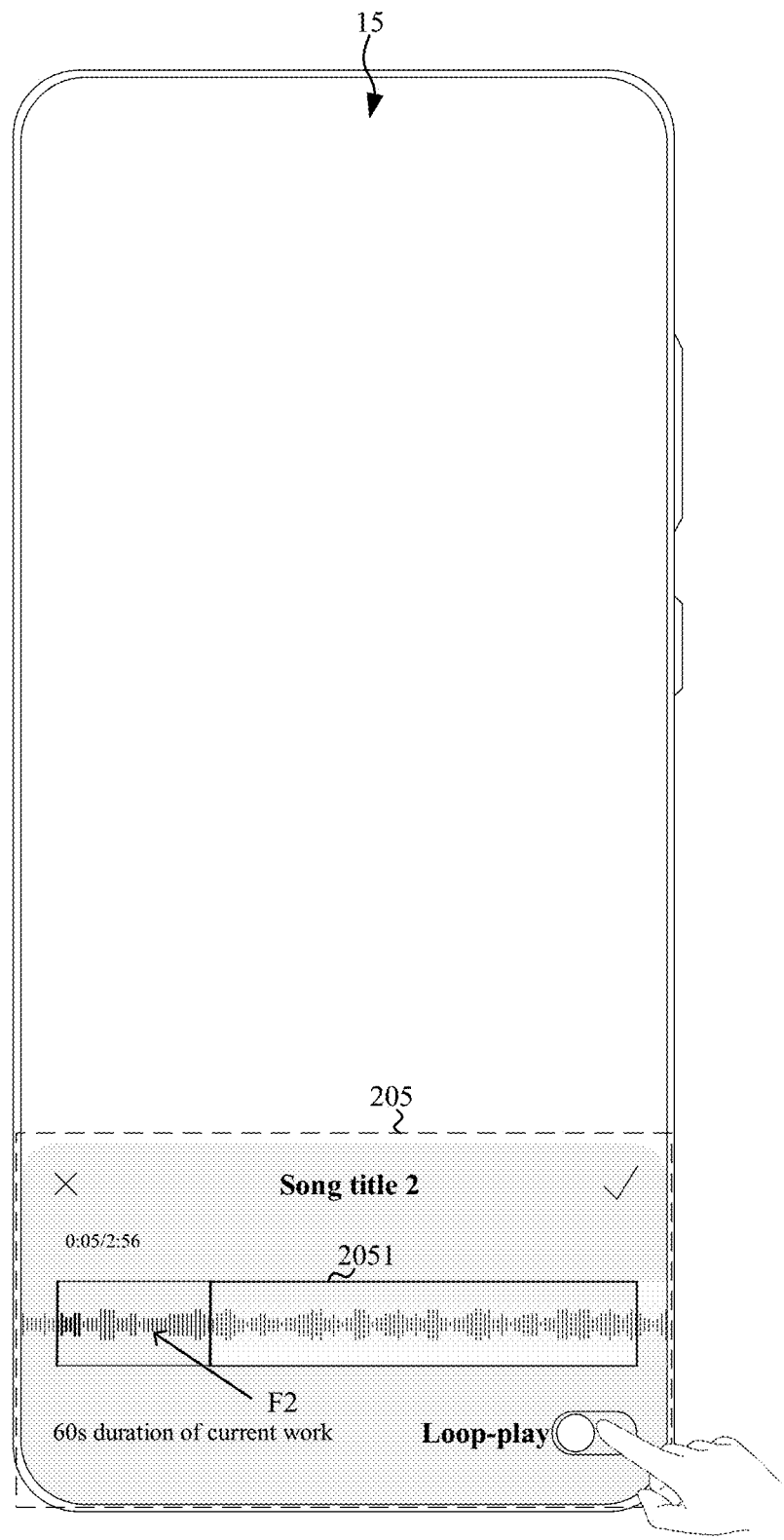
Figure 3M:
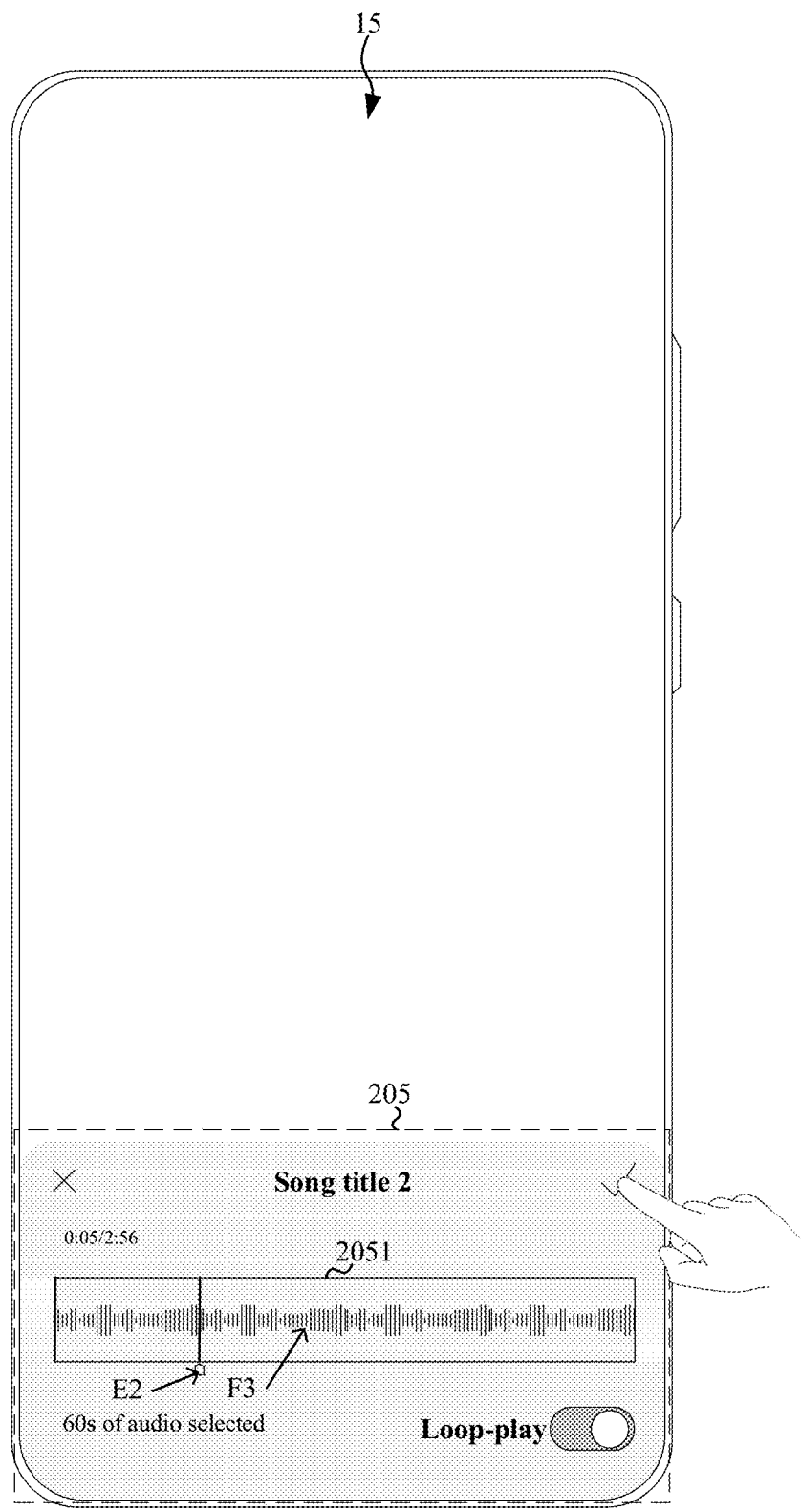
Figure 3N:
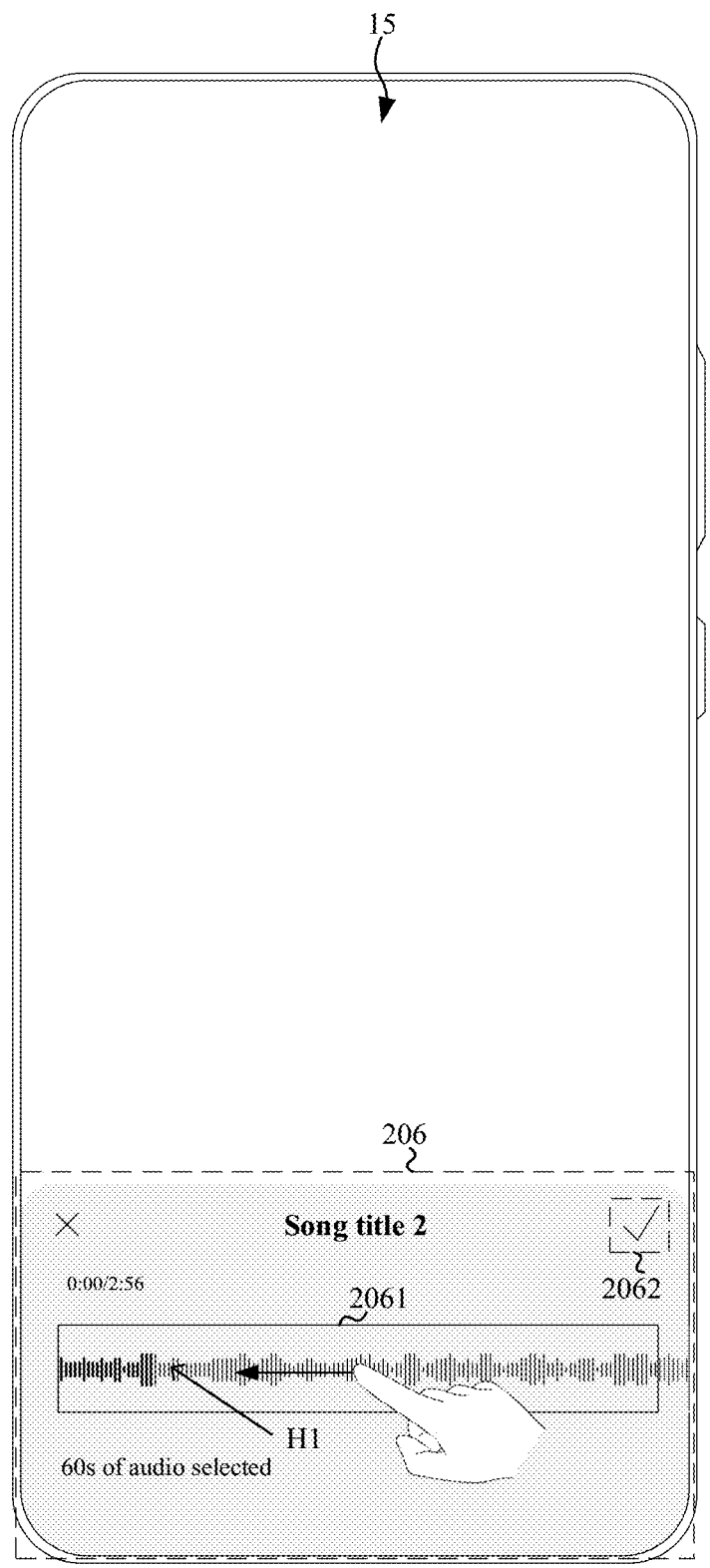
Figure 3O:
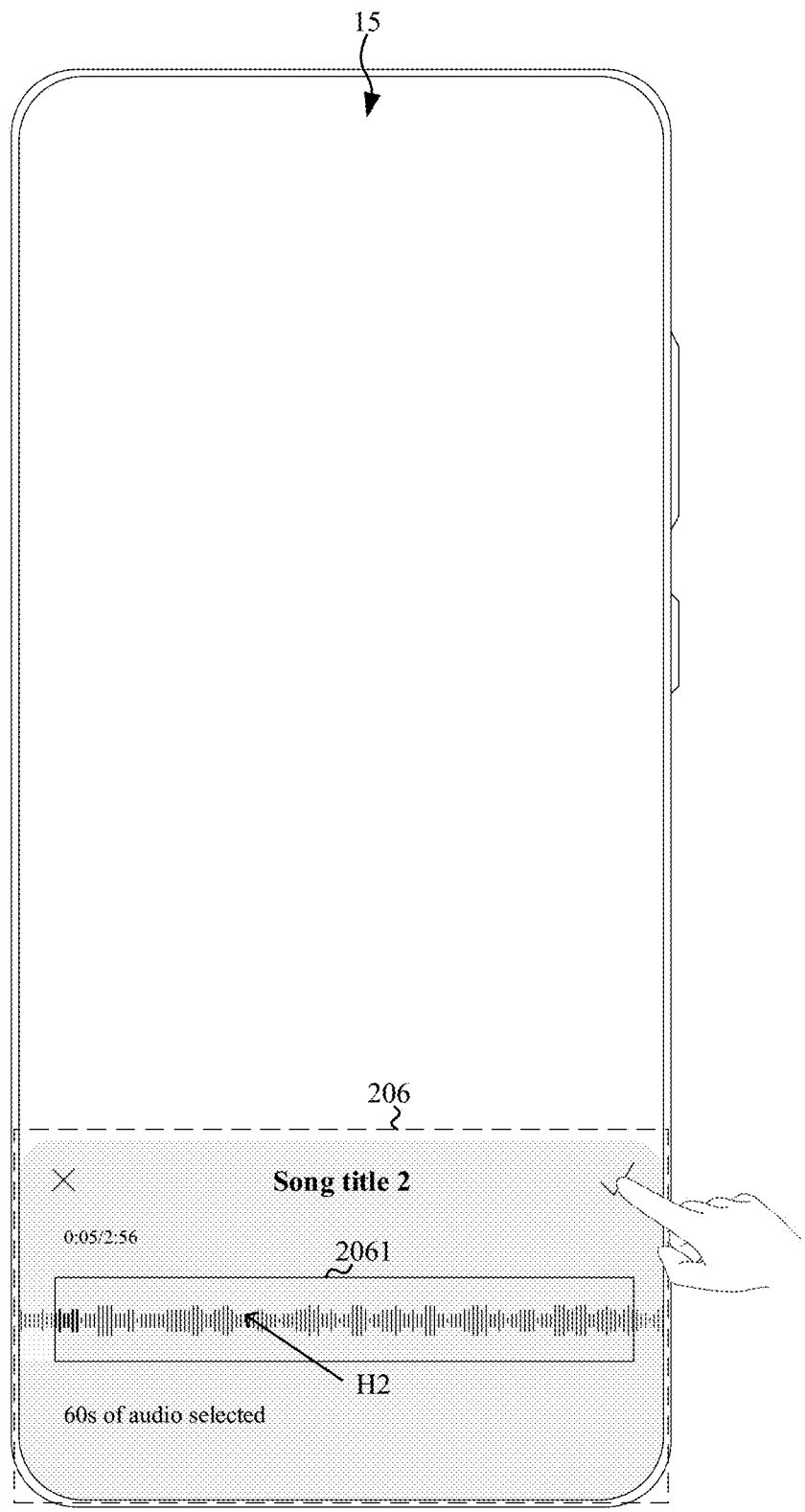

Referring to FIG. 3A to FIG. 3O, FIG. 3A to FIG. 3O are schematic diagrams of human-computer interaction interfaces according to an embodiment of the present disclosure.

In FIG. 1B, the user interface 12 may include control 1031. The control 1031 is used to capture a video in real time.

After receiving an operation performed by the user on the user interface 12 shown in FIG. 1B, such as clicking on the control 1031, the application 1 may display the user interface 14 exemplarily shown in FIG. 3A on the mobile phone. The user interface 14 is used to display the captured video 1 in real time and provide an entrance for processing an audio for the video 1.

The user interface 14 may include: a control 201, the control 201 is used to provide an entry for processing audio for the video 1, and display the title of the selected audio.

After receiving an operation performed by the user on the user interface 14 shown in FIG. 3A, such as clicking on the control 201, the application 1 may display the user interface 15 exemplarily shown in FIG. 3B on the mobile phone. The user interface 15 is used to provide the audios that can be used in the video 1.

The user interface 15 may include: a window 202. Options 2021 and 2022 are displayed in the window 202.

The option 2021 is used to provide an audio 2: display relevant information of the audio 2, such as a song title 1, play duration of the audio 2 of 38s and a cover of the audio 2; and provide an entrance for editing the audio 2.

The option 2022 is used to provide an audio 1: display relevant information of the audio 1, such as a song title 2, a play duration "xx:xx" of the audio 1 and a cover of the audio 1, and provide an entrance for editing the audio 1.

After receiving an operation performed by the user in window 202 shown in FIG. 3B, such as clicking on the option 2022, the application 1 may display a control 2023 exemplarily shown in FIG. 3C on the window 202. The control 2023 is used to provide an entrance for editing the audio 1.

The play duration "xx:xx" of audio 1 is fixed, the play duration of the video 1 is fixed, and the licensed duration of audio 1 is also fixed. Thus, the application 1 may determine whether to play the audio 1 on a loop based on the values of the play duration of the audio 1, the licensed duration of the audio 1, and the play duration of the video 1, to dynamically display the page for editing the audio 1.

Hereinafter, four cases are used to illustrate the page for editing the audio 1 in application 1.

In the first case, the play duration "xx:xx" of audio 1 is "00:42", and the play duration of audio 1 is less than the play duration of the video 1 of 60 s.

After receiving an operation performed by the user in the area 202 shown in FIG. 3C, such as clicking on the control 2023, the application 1 may display the window 203 exemplarily shown in FIG. 3D on the user interface 15. The window 203 is used to present the page for editing the audio 1.

The window 203 may include: an area 2031, a control 2023 and a control 2033.

A position A1 and a waveform B1 are displayed in the area 2031. The position A1 is a starting play position of the audio 1. The waveform B1 is an entire music waveform of the audio 1.

The control 2032 is in a first state, which is used to control the audio 1 to be not played on a loop while playing the video.

The control 2033 is used to confirm the selected audio.

After receiving an operation performed by the user in the window 203 shown in FIG. 3D, such as switching the state of the control 2032, the application 1 may display the updated control 2032 and the updated area 2031 exemplarily shown in FIG. 3E on the window 203.

The control 2032 is in the second state, which is used to control the audio 1 to be played on a loop while playing the video. In addition to the position A1 and the waveform B1, the position A2 and the waveform B2 are further displayed in the updated area 2031. The position A2 is a starting loop position of the audio 1. The waveform B2 is a loop waveform of the audio 1.

After receiving an operation performed by the user in the window 203 shown in FIG. 3E, such as clicking on the control 2033, the application 1 may display the updated window 202 shown exemplarily in FIG. 3E on the user interface 15. For example, the option 2021 and option 2022 that have been swapped places are displayed in the updated window 202.

For example after receiving a click operation performed by the user on the user interface 15 shown in FIG. 3F, application 1 may display the user interface 14 exemplarily shown in FIG. 3G on the mobile phone. The title of the selected audio 1, such as, the song title 2, is displayed at the control 201 on the user interface 14.

It should be noted that, when the user does not want to loop the audio 1, after receiving the operation performed by the user in window 203 shown in FIG. 3E, such as switching the state of control 2032, the application 1 may display the first state of the control 2032 and the area 2031 exemplarily shown in FIG. 3D on the window 203. Thus, the area 2031 and the control 2032 in different states in the window 203 can be switched between FIG. 3D and FIG. 3E, so as to satisfy the intention of the user.

In the second case, the play duration "xx:xx" of the audio 1 is "00:42", the play duration of the audio 1 is less than the play duration of the video 1 of 60 s, and the licensed duration of the audio 1 of 15 s is less than the play duration of the audio 1.

After receiving an operation performed by the user in the area 202 shown in FIG. 3C, such as clicking on the control 2023, the application 1 may display a window 204 exemplarily shown in FIG. 3H on the user interface 15. The window 204 is used to present the page for editing the audio 1.

The window 204 may include: an area 2041, a control 2042 and a control 2043.

A position C1, a small window cd and an entire music waveform of the audio 1 are displayed in the area 2041. The position C1 is a starting play position of the audio 1. The small window cd is used to display the music waveform D1 of audio 1 within the licensed duration of audio 1.

The control 2042 is in the first state, which is used to control the audio 1 to be not played on a loop while playing the video.

The control 2043 is used to confirm the selected audio.

After receiving an operation performed by the user in the window 204 shown in FIG. 3H, such as dragging the music waveform of the audio 1, the application 1 may display the updated area 2041 exemplarily shown in FIG. 3I on the window 204.

In addition to the position C1, the updated small window cd is further displayed in the updated area 2041. The updated small window cd is used to display the waveform D2 of the audio with the licensed duration selected by the user from the music waveform of the audio 1.

After receiving an operation performed by the user in the window 204 shown in FIG. 3I, such as switching the state of the control 2042, the application 1 may display the updated control 2042 and the updated area 2041 exemplarily shown in FIG. 3J on the window 204.

The control 2042 is in the second state, which is used to control the audio 1 to be played on a loop while playing the video. In addition to the position C1 and the waveform D2, a position C2 and a waveform D3 are further displayed in the updated area 2041. The position C2 is a starting loop position of the audio 1, and the waveform D3 is a loop waveform of the audio 1 obtained by looping the waveform D2.

After receiving an operation performed by the user in the window 204 shown in FIG. 3J, such as clicking on the control 2043, the application 1 may display the updated window 202 shown exemplarily in FIG. 3F on the user interface 15. For example, the option 2021 and option 2022 that have been swapped places are displayed in the updated window 202.

For example, after receiving the click operation performed by the user on the user interface 15 shown in FIG. 3F, the application 1 may display the user interface 14 exemplarily shown in FIG. 3G on the mobile phone. The title of the selected audio 1, such as, the song title 2, is displayed at the control 201 on the user interface 14.

It should be noted that, when the user does not want to loop the audio 1, after receiving the operation performed by the user in window 204 shown in FIG. 3J, such as switching the state of control 2042, the application 1 may display the first state of the control 2042 and the area 2041 exemplarily shown in FIG. 3I on the window 204. Thus, the area 2042 and the control 2042 in different states in the window 204 can be switched between FIG. 3I and FIG. 3J, so as to satisfy the intention of the user.

In addition, after the control 2042 is in the second state, the user cannot replace the selected waveform D2 by the operation of moving the music waveform of audio 1 in the area 2041.

In the third case, the play duration "xx:xx" of the audio 1 is "02:56", the play duration of the audio 1 is greater than the play duration of the video 1 of e.g., 60 s, and the licensed duration of the audio 1 of 15 s is less than the play duration of the video 1 of 60 s.

After receiving an operation performed by the user in the area 202 shown in FIG. 3C, such as clicking on the control 2023, the application 1 may display the window 205 exemplarily shown in FIG. 3K on the user interface 15. The window 205 is used to present the page for editing the audio 1.

The window 205 may include: an area 2051, a control 2052 and a control 2053.

A position E1, a small window ef and a partial music waveform of the audio 1 are displayed in the area 2051. The position E1 is a starting play position of the audio 1. The small window ef is used to present the music waveform F1 of the audio 1 within the licensed duration of the audio 1.

The control 2052 is in the first state, which is used to control the audio 1 to be not played on a loop while playing the video.

The control 2053 is used to confirm the selected audio.

After receiving an operation performed by the user in the window 205 shown in FIG. 3K, such as dragging the partial music waveform of the audio 1, the application 1 may display the updated area 2051 exemplarily shown in FIG. 3L on the window 205.

In addition to the position E1, the updated partial music waveform of the audio 1 and the updated small window ef are further displayed in the updated area 2051. The updated small window ef is used to display the waveform F2 of the audio with the licensed duration selected from the updated partial music waveform of the audio 1.

After receiving an operation performed by the user in the window 205 shown in FIG. 3L, such as switching the state of the control 2052, the application 1 may display the updated control 2052 and the updated area 2051 exemplarily shown in FIG. 3M on the window 205.

The control 2052 is in the second state, which is used to control the audio 1 to be played on a loop while playing the video. In addition to the position E1 and the waveform F2, a position E2 and a waveform F3 are further displayed in the updated area 2051. The position E2 is a starting loop position of the audio 1. The waveform F3 is the loop waveform of the audio 1 obtained by looping the waveform F2.

After receiving an operation performed by the user in the window 205 shown in FIG. 3M, such as clicking on the control 2053, the application 1 may display the updated window 202 shown exemplarily in FIG. 3F on the user interface 15. For example, the option 2021 and option 2022 that have been swapped places are displayed in the updated window 202.

For example, after receiving the click operation performed by the user on the user interface 15 shown in FIG. 3F, the application 1 may display the user interface 14 exemplarily shown in FIG. 3G on the mobile phone. The title of the selected audio 1, such as, the song title 2, is displayed at the control 201 on the user interface 14.

It should be noted that, when the user does not want to loop the audio 1, after receiving the operation performed by the user in window 205 shown in FIG. 3M, such as switching the state of control 2052, the application 1 may display the first state of the control 2052 and the area 2051 exemplarily shown in FIG. 3L on the window 205. Thus, the area 2052 and the control 2052 in different states in the window 205 can be switched between FIG. 3L and FIG. 3M, so as to satisfy the intention of the user.

In addition, after the control 2052 is in the second state, the user cannot replace the selected waveform D2 by an operation of moving the music waveform of audio 1 in the area 2051.

In the fourth case, the play duration "xx:xx" of the audio 1 is "02:56", and the play duration of the audio 1 is greater than the play duration of the video 1 of 60 s After receiving an operation performed by the user in area 202 shown in FIG. 3C, such as clicking on the control 2023, the application 1 may display a window 206 exemplarily shown in FIG. 3N on the user interface 15. The window 206 is used to present the page for editing the audio 1.

The window 206 may include: an area 2061 and a control 2062.

A waveform H1 is displayed in the area 2061. The waveform H1 is a partial music waveform of the audio 1.

The control 2062 is used to confirm the selected audio.

After receiving an operation performed by the user in the window 206 shown in FIG. 3N, such as dragging a partial music waveform of the audio 1, the application 1 may display the updated area 2061 exemplarily shown in FIG. 3O on the window 206. A waveform H2 is displayed in the updated area 2061. The waveform H2 is the updated partial music waveform of the audio 1.

After receiving an operation performed by the user in the window 206 shown in FIG. 3O, such as clicking on the control 2062, the application 1 may display the updated window 202 shown exemplarily in FIG. 3F on the user interface 15. For example, the option 2021 and option 2022 that have been swapped places are displayed in the updated window 202.

For example, after receiving the click operation performed by the user on the user interface 15 shown in FIG. 3F, the application 1 may display the user interface 14 exemplarily shown in FIG. 3G on the mobile phone. The title of the selected audio 1, such as, the song title 2, is displayed at the control 201 on the user interface 14.

It should be noted that before the click operation on the control 2062 in FIG. 3O, the user may replace the selected waveform H2 by the operation of moving the music waveform of audio 1 in the area 2061.

Furthermore, the application 1 may post the video 1 on the application 1 to enable the users of the application 1 to view. In this way, when the user wants to play the video 1, in the process of playing the video 1, the user may select whether the audio 1 is displayed on a loop or not on a loop based on the display and state of the control for playing the audio 1 on a loop in the case 1, the case 2, the case 3 and the case 4.

In addition, the application 1 receives an operation performed by the user in the window 202 shown in FIG. 3B, such as, selecting the other audio (e.g., the option 2021 corresponding to audio 2) except the audio 1. Then, the application 1 may determine whether to play the audio 2 on a loop based on the values of the play duration of the audio 2, the licensed duration of the audio 2, and the capturing mode duration for capturing the video, to dynamically display the page for editing the audio 2. The specific implementation processes may refer to the description of the page for editing the audio 1 in the case 1, the case 2, the case 3 and the case 4, which will not be repeated here.

Third Scenario

Referring to FIG. 4A to FIG. 4D, FIG. 4A to 4D are schematic diagrams of human-computer interaction interfaces according to an embodiment of the present disclosure.

In FIG. 1B, the user interface 12 may include a control 1032. The control 1032 is used to insert the video 1 that has been captured on the mobile phone.

Figure 4A:
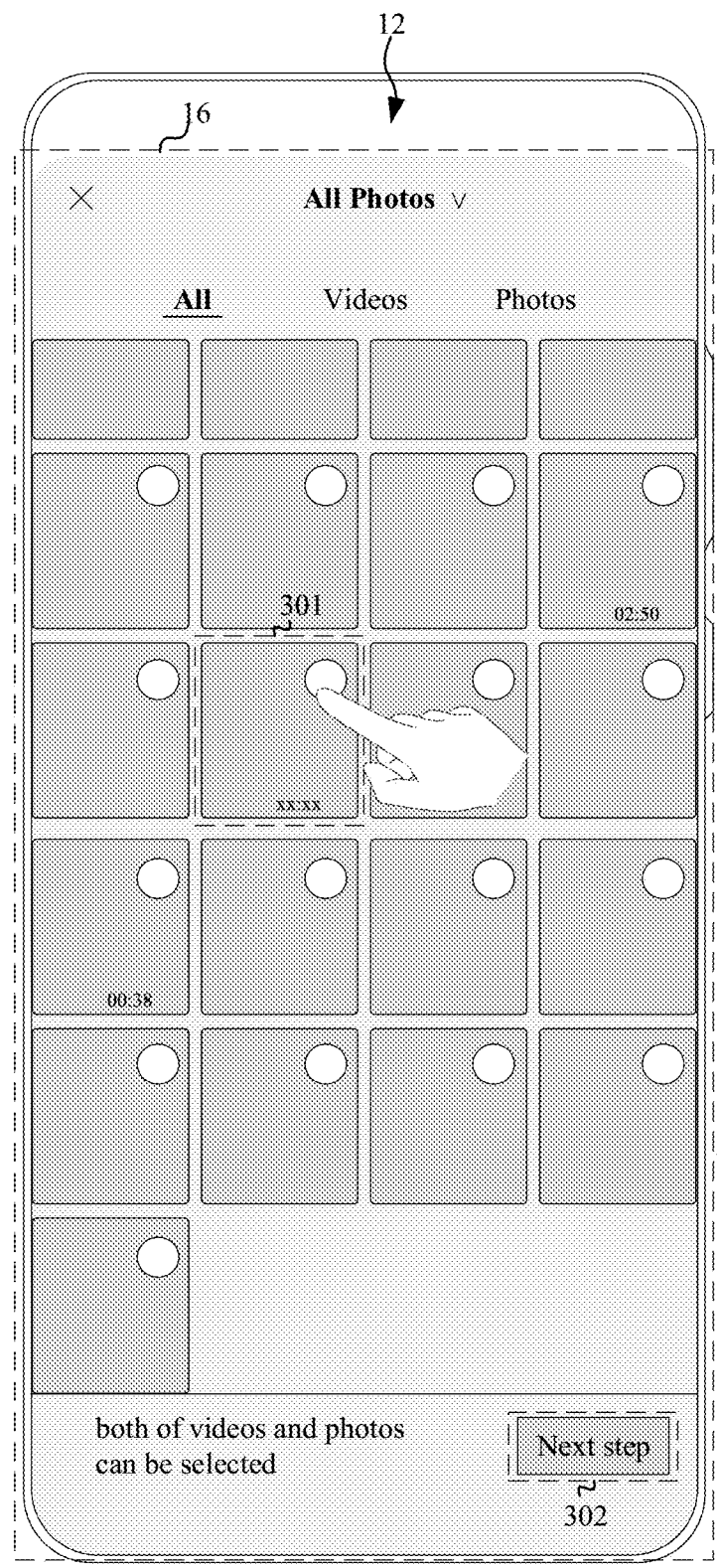
FIG. 4A to 4D are schematic diagrams of human-computer interaction interfaces according to an embodiment of the present disclosure.

After receiving an operation performed by the user on the user interface 12 shown in FIG. 1B, such as clicking on control 1032, the application 1 may display the page 16 exemplarily shown in FIG. 4A on the user interface 12. The page 16 is used to display the video 1 that has been captured on the mobile phone and provides an entrance for processing an audio for the video 1.

An option 301 and a control 302 are displayed on the page 16.

The option 301 is used to provide an audio 1: and display relevant information of the audio 1, such as play duration "xx:xx" of the audio 1 and a cover of the audio 1.

The control 302 is used to provide an entrance for editing the audio 1.

Figure 4B:
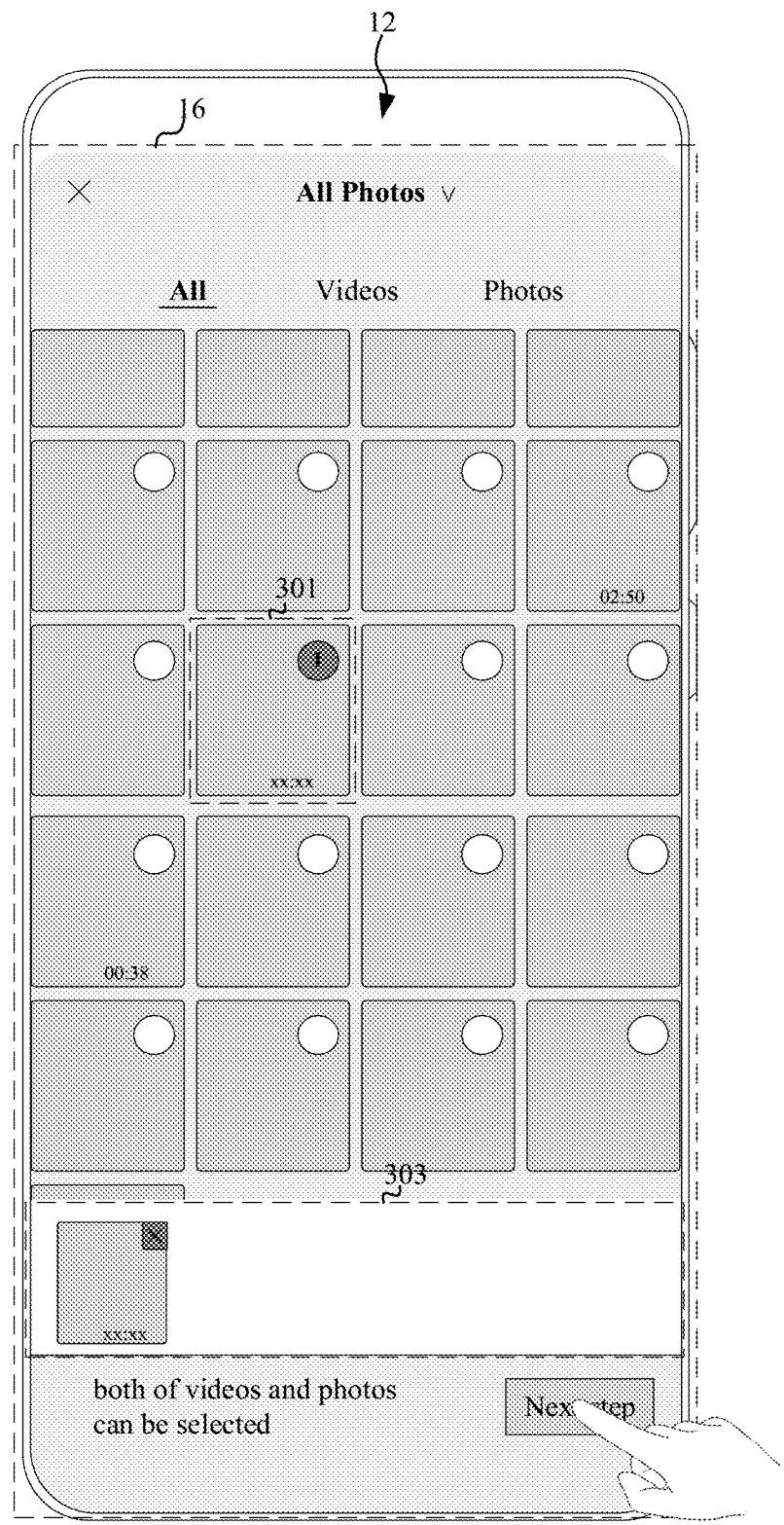

After receiving an operation performed by the user on the page 16 shown in FIG. 4A, such as clicking option 301, the application 1 may display an area 303 and an updated option 301 exemplarily shown in FIG. 4B on the page 16.

The area 303 is used to display a thumbnail of the control 301. The updated option 301 is used to display the quantity of option 301 selected by the user.

Figure 4C:
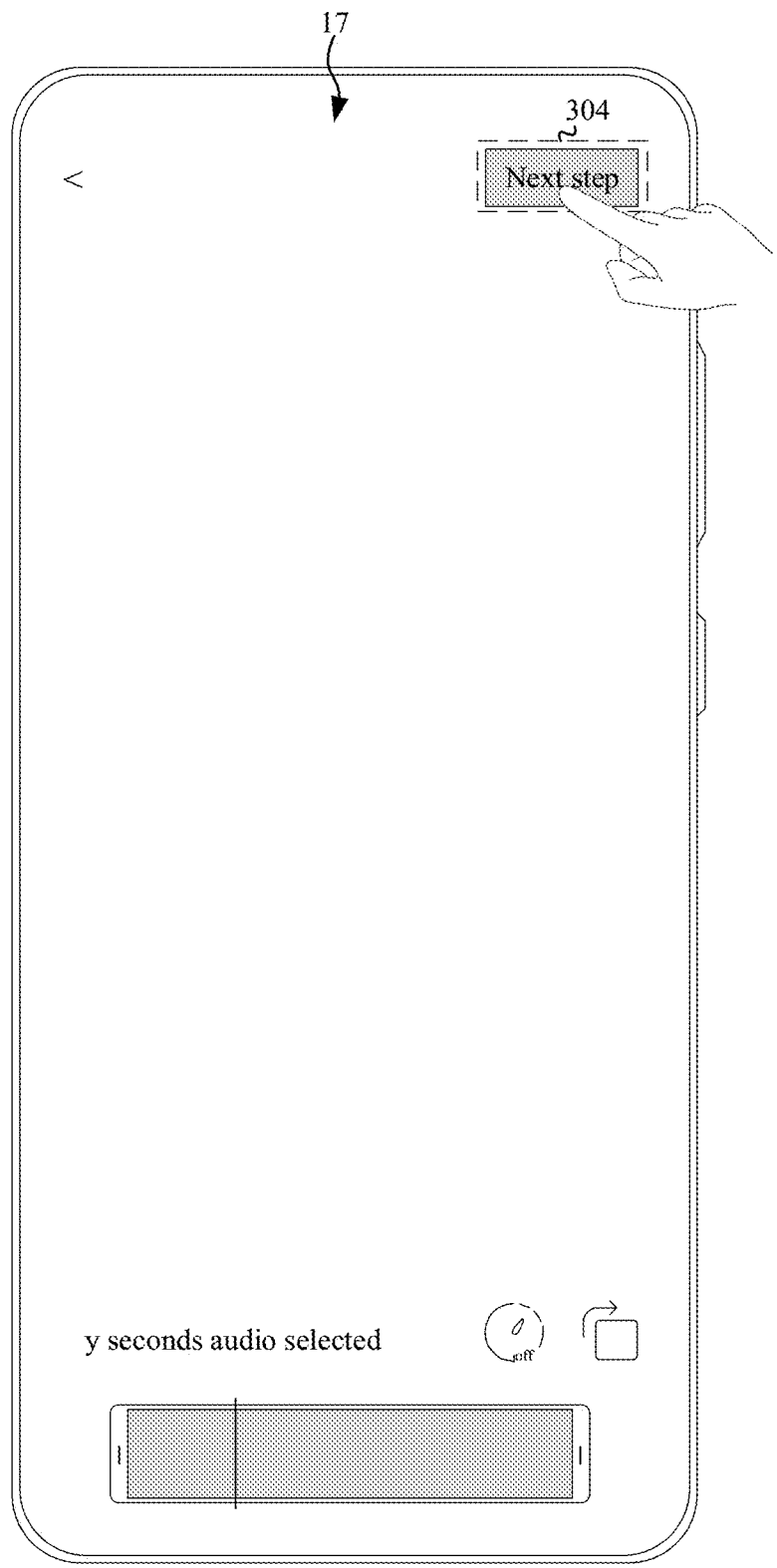

After receiving an operation performed by the user on the page 16 shown in FIG. 4B, such as clicking the control 302, the application 1 may display the user interface 17 exemplarily shown in FIG. 4C on the mobile phone. The user interface 17 is used to play the video 1.

The user interface 17 may include: a control 304. The control 304 is configured to provide an entrance for editing the audio 1.

Figure 4D:
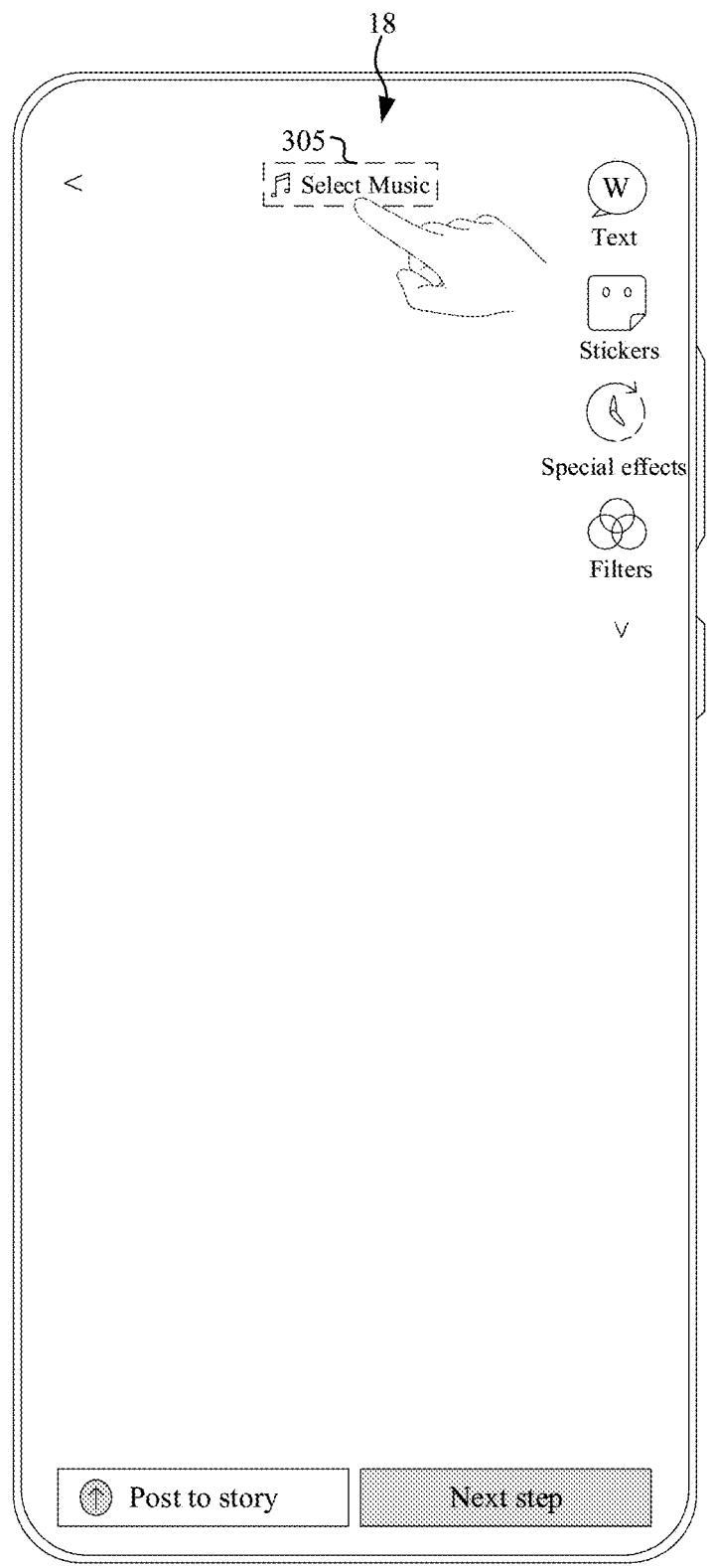

After receiving an operation performed by the user on the user interface 17 shown in FIG. 4C, such as clicking on control 304, the application 1 may display the user interface 18 exemplarily shown in FIG. 4D on the mobile phone. The user interface 18 is used to display the video 1 and provide an entrance for processing an audio for the video 1.

The user interface 18 may include: a control 305, which is configured to provide an entrance for processing the audio for the video 1 and display a title of the selected audio.

After receiving an operation performed by the user on the user interface 18 shown in FIG. 4D, such as clicking on the control 305, the application 1 may display the user interface 15 exemplarily shown in FIG. 3B on the mobile phone. The user interface 15 is used to provide the audios that can be used in video 1.

The specific implementation of the user interface 15 may refer to the description of FIG. 3B in the second scenario, and the specific implementation process of selecting the audio 1 may refer to the description of FIGS. 3B to 3O in the second scenario, which will not be repeated here.

Furthermore, the application 1 may post the video 1 on the application 1 to enable the users of the application 1 to view: In this way, when the user wants to play the video 1, in the process of playing the video 1, the user may select whether the audio 1 is displayed on a loop or not on a loop based on the display and state of the control for playing the audio 1 on a loop in the case 1, the case 2, the case 3 and the case 4.

In addition, the application 1 receives an operation performed by the user in the window 202 shown in FIG. 3B, such as, selecting other audios (e.g., the option 2021 corresponding to audio 2) rather than the audio 1. Then, the application 1 may determine whether to play the audio 2 on a loop based on the values of the play duration of the audio 2, the licensed duration of the audio 2, and the capturing mode duration for capturing the video, to dynamically display the page for editing the audio 2. The specific implementation processes may refer to the description of the page for editing the audio 1 in the case 1, the case 2, the case 3 and the case 4, which will not be repeated here.

Figure 5:
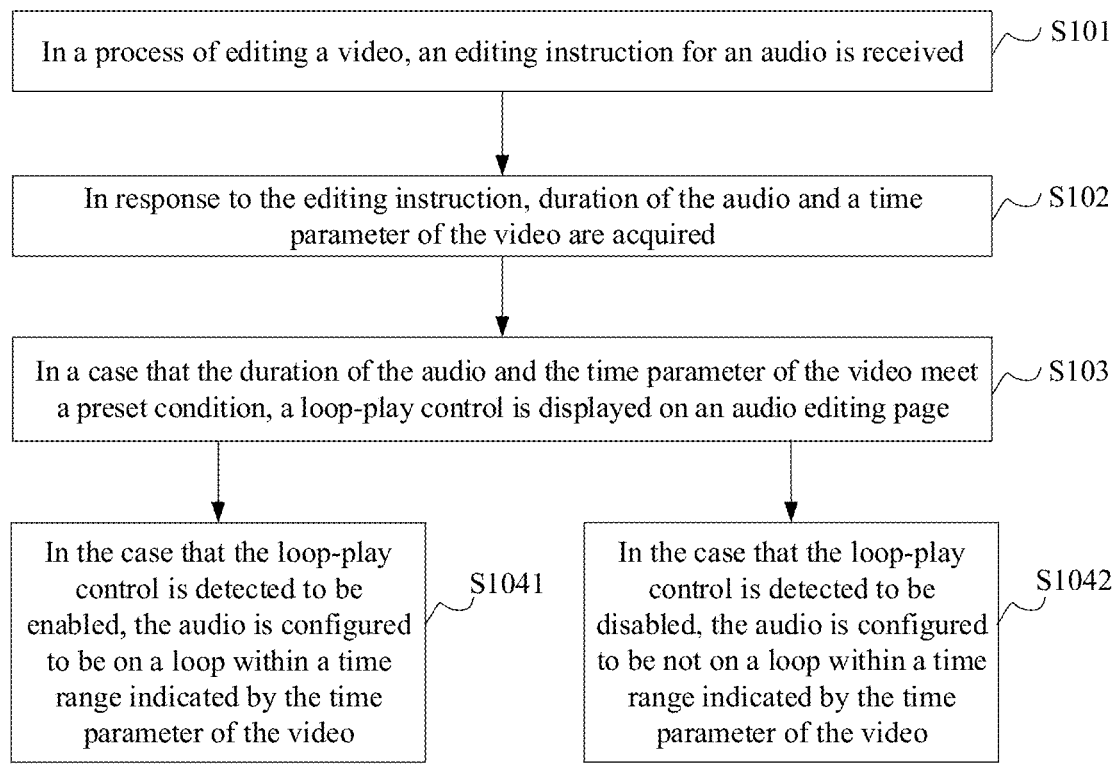
FIG. 5 is a schematic flowchart of a video processing method for an application according to an embodiment of the present disclosure.

Based on the description of the embodiments of FIG. 1A to FIG. 1B, FIG. 2A to FIG. 2M, FIG. 3A to FIG. 3O and FIG. 4A to FIG. 4D, in combination with FIG. 5, a specific implementation process of a video processing method for an application provided by an embodiment of the present disclosure is provided in detail.

Referring to FIG. 5, FIG. 5 is a schematic flowchart of a video processing method for an application according to an embodiment of the present disclosure. As shown in FIG. 5, the video processing method for the application according to the embodiment of the present disclosure may include as follows.

In S101, in a process of editing a video, an editing instruction for an audio is received.

The video may be a video that has not been created by the user, or a video that has been created in real time, or a video stored in an electronic device, which is not limited in this embodiment of the present disclosure. The audio is an audio in the application program, such as a complete song, or a segment of a song, or a clipped segment of audio, etc., which is not limited in this embodiment of the present disclosure.

The process of editing the video may include: adding the audio in advance to a video that has not been finished capturing, or adding audio to the video that has been captured.

The editing instruction is used to indicate that the audio is used as a soundtrack of the video, so that the audio can be played along with the video. The specific implementation of the editing instruction is not limited in the embodiments of the present disclosure. In some embodiments, the editing instruction may include, but be not limited to click, double-click, long-press, sliding and other types of operations. For example, when an area/component for editing the audio is set on a page of the application (such as, the page 13 in the embodiment of FIG. 2A or the window 202 in the embodiment of FIG. 3A), the editing instruction is an operation received on the area/component.

In some embodiments, the application is the application 1 in FIG. 1A to FIG. 1B and FIG. 2A to FIG. 2M, and the audio is the audio 1 in the embodiments of FIG. 2A to FIG. 2M. In this case, the specific implementation of the editing instruction may refer to for example the description of the click operation performed in the area 1041 in the embodiment of FIG. 2A, which will not be repeated here.

In some other embodiments, the application is the application 1 in FIG. 1A to FIG. 1B, FIG. 3A to FIG. 3O and FIG. 4A to FIG. 4D, and the audio is the audio 1 in the embodiments of FIG. 3B to FIG. 3O and FIG. 4A to FIG. 4D. In this case, the specific implementation of the editing instruction may refer to the description of the operation performed in the window 202 in the embodiment of FIG. 3B, such as clicking the option 2022, which will not be repeated here.

In S102, in response to the editing instruction, duration of the audio and a time parameter of the video are acquired.

After receiving the editing instruction, the electronic device may detect a current state of the application, so as to acquire the duration of the audio and the time parameter of the video.

The duration of the audio includes: play duration or licensed duration of the audio. The time parameter of the video includes: play duration of the video or capturing mode duration for capturing the video.

In S103, in a case that the duration of the audio and the time parameter of the video meet a preset condition, a loop-play control is displayed on an audio editing page.

The electronic device may determine whether a condition corresponding to the current scenario satisfies the preset condition based on the duration of the audio and the time parameter of the video. If the preset condition is met, the electronic device may display the loop-play control on the audio editing page.

The audio editing page may be a page of the application. Moreover, parameters such as the shape, size, color, and position of the loop-play control are not limited in the embodiments of the present disclosure.

The preset condition may be understood as a condition that the audio can be played on a loop along with the play of the video. If the duration of the audio is longer than the duration of the video, the preset condition is not satisfied. Moreover, specific content of the preset condition is not limited in the embodiments of the present disclosure.

In some embodiments, the application is the application 1 in FIG. 1A to FIG. 1B and FIG. 2A to FIG. 2M, and the audio is the audio 1 in the embodiments of FIG. 2A to FIG. 2M. In this case, the specific implementation of the audio editing page may refer to the description of the window 106 in the embodiment of FIG. 2C, and the specific implementation of the loop-play control may refer to the description of the control 1062 in the embodiment of FIG. 2C, which will not be repeated here.

In some other embodiments, the application is the application 1 in FIG. 1A to FIG. 1B, FIG. 3A to FIG. 3O and FIG. 4A to FIG. 4D, and the audio is the audio 1 in FIG. 3A to FIG. 3O and FIG. 4A to FIG. 4D. In this case, the specific implementation of the audio editing page may refer to the description of window 204 in the embodiment of FIG. 3H, and the specific implementation of the loop-play control may refer to the description of control 2042 in the embodiment of FIG. 3H, which will not be repeated here.

In some embodiments, the application is the application 1 in FIG. 1A to FIG. 1B and FIG. 2A to FIG. 2M, and the audio is the audio 1 in the embodiments of FIG. 2A to FIG. 2M. In this case, the specific implementation of the audio editing page may refer to the description of the window 107 in the embodiment of FIG. 2F, and the specific implementation of the loop-play control may refer to the description of the control 1072 in the embodiment of FIG. 2F, which will not be repeated here.

In some other embodiments, the application is the application 1 in FIG. 1A to FIG. 1B, FIG. 3A to FIG. 3O and FIG. 4A to FIG. 4D, and the audio is the audio 1 in FIG. 3A to FIG. 3O and FIG. 4A to FIG. 4D. In this case, the specific implementation of the audio editing page may refer to the description of window 204 in the embodiment of FIG. 3H, and the specific implementation of the loop-play control may refer to the description of control 2042 in the embodiment of FIG. 3H, which will not be repeated here.

In some embodiments, the application is the application 1 in FIG. 1A to FIG. 1B and FIG. 2A to FIG. 2M, and the audio is the audio 1 in the embodiments of FIG. 2A to FIG. 2M. In this case, the specific implementation of the audio editing page may refer to the description of the window 108 in the embodiment of FIG. 2I, and the specific implementation of the loop-play control may refer to the description of the control 1082 in the embodiment of FIG. 2I, which will not be repeated here.

In some other embodiments, the application is the application 1 in FIG. 1A to FIG. 1B, FIG. 3A to FIG. 3O and FIG. 4A to FIG. 4D, and the audio is the audio 1 in FIG. 3A to FIG. 3O and FIG. 4A to FIG. 4D. In this case, the specific implementation of the audio editing page may refer to the description of window 205 in the embodiment of FIG. 3K, and the specific implementation of the loop-play control may refer to the description of control 2052 in the embodiment of FIG. 3K, which will not be repeated here.

In S1041, in the case that the loop-play control is detected to be enabled, the audio is configured to be on a loop within a time range indicated by the time parameter of the video.

Enabling loop-play control may be understood as the loop-play control in an on state by the operation on the loop-play control. The aforementioned operations may include, but be not limited to, click, double-click, long-press, sliding and other types of operations. For example, when the loop-play control is displayed as a switch button, the foregoing operation is an operation of turning on the loop-play control.

The audio configured to be on a loop within a time range indicated by the time parameter of the video may be understood as looping the audio within the time range indicated by the time parameter of the video.

In some embodiments, the application is the application 1 in FIG. 1A to FIG. 1B and FIG. 2A to FIG. 2M, and the audio is the audio 1 in the embodiments of FIG. 2A to FIG. 2M. In this case, the specific implementation of the aforementioned operations may refer to the description of the operation performed in the window 106 in the embodiment of FIG. 2C, such as switching the state of the control 1062 to the second state: the specific implementation of the aforementioned operations may refer to the description of the operation performed in the window 107 in the embodiment of FIG. 2G, such as switching the state of the control 1072 to the second state: or the specific implementation of the aforementioned operations may refer to the description of the operation performed in the window 108 in the embodiment of FIG. 2J such as switching the state of the control 1082 to the second state, which will not be repeated here.

In some other embodiments, the application is the application 1 in FIG. 1A to FIG. 1B, FIG. 3A to FIG. 3O and FIG. 4A to FIG. 4D, and the audio is the audio 1 in FIG. 3A to FIG. 3O and FIG. 4A to FIG. 4D. In this case, the specific implementation of the aforementioned operations may refer to the description of the operation performed in the window 203 in the embodiment of FIG. 3D, such as switching the state of the control 2032 to the second state: the specific implementation of the aforementioned operations may refer to the description of the operation performed in the window 204 in the embodiment of FIG. 3I, such as switching the state of the control 2042 to the second state: or the specific implementation of the aforementioned operations may refer to the description of the operation performed in the window 205 in the embodiment of FIG. 3L, such as switching the state of the control 2052 to the second state, which will not be repeated here.

In S1042, in the case that the loop-play control is detected to be disabled, the audio is configured to be not on a loop within a time range indicated by the time parameter of the video.

Disabling the loop-play control may be understood as the loop-play control in an off state by the operation on the loop-play control. The aforementioned operations may include, but not limited to, click, double-click, long-press, sliding and other types of operations. For example, when the loop-play control is displayed as a switch button, the foregoing operation is an operation of turning off the loop-play control.

The audio configured to be not on a loop within a time range indicated by the time parameter of the video may be understood as that the audio cannot be played on a loop within the time range indicated by the time parameter of the video.

In some embodiments, the application is the application 1 in FIG. 1A to FIG. 1B and FIG. 2A to FIG. 2M, and the audio is the audio 1 in the embodiments of FIG. 2A to FIG. 2M. In this case, the specific implementation of the aforementioned operations may refer to the description of the operation performed in the window 106 in the embodiment of FIG. 2D, such as switching the state of the control 1062 to the first state: the specific implementation of the aforementioned operations may refer to the description of the operation performed in the window 107 in the embodiment of FIG. 2H, such as switching the state of the control 1072 to the first state: or the specific implementation of the aforementioned operations may refer to the description of the operation performed in the window 108 in the embodiment of FIG. 2K such as switching the state of the control 1082 to the first state, which will not be repeated here.

In some other embodiments, the application is the application 1 in FIG. 1A to FIG. 1B, FIG. 3A to FIG. 3O and FIG. 4A to FIG. 4D, and the audio is the audio 1 in FIG. 3A to FIG. 3O and FIG. 4A to FIG. 4D. In this case, the specific implementation of the aforementioned operations may refer to the description of the operation performed in the window 203 in the embodiment of FIG. 3E, such as switching the state of the control 2032 to the first state: the specific implementation of the aforementioned operations may refer to the description of the operation performed in the window 204 in the embodiment of FIG. 3J such as switching the state of the control 2042 to the first state: or the specific implementation of the aforementioned operations may refer to the description of the operation performed in the window 205 in the embodiment of FIG. 3M, such as switching the state of the control 2052 to the first state, which will not be repeated here.

Based on the intention of the user, whether the audio is played on a loop while playing the video can be controlled by means of the operations performed on the loop-play control. As a result, the user can make creation freely, which is beneficial to improve the play effect of the video created by the user.

It should be noted that the default state of the loop-play control may be an enabled state or a disabled state, which is not limited in this embodiment of the present disclosure. The state of the loop-play control may be switched between the enabled state and the disabled state. In other words, the loop-play control may be switched from the enabled state to the disabled state, and may also be switched from the disabled state to the enabled state.

With the video processing method for an application according to the embodiments of the present disclosure, the electronic device may receive an instruction for editing an audio in the video editing process: and acquire duration of the audio and time parameter of the video after receiving the editing instruction: and display a loop-play control on an audio editing page in a case that the duration of the audio and the time parameter of the video meet a preset condition. In this way, the electronic device may configure the audio to be on a loop within a time range indicated by the time parameter of the video, in a case that the loop-play control is detected to be enabled: and configure the audio to be not on a loop within the time range indicated by the time parameter of the video, in a case that the loop-play control is detected to be disabled.

Hence, according to practical scenario, the electronic device can display a control on the page, which is convenient for the user to manually control whether the audio is played on a loop by means of the control, so that the user can freely control the duration of the audio based on the play duration, which improves the freedom of the user in creating videos to offer full creative freedom and convenience to the user, and facilitates more users to create and post videos in the application.

Based on the above description, the first control may be dynamically displayed on the audio editing page. That is, the loop-play control may be displayed on the audio editing page, which is helpful for users to freely create videos, or the loop-play control may not be displayed, which is conducive to simplifying content presentation.

In some embodiments, when the duration of the audio and the time parameter of the video do not meet the preset condition, the electronic device may not display the loop-play control on the audio editing page. Thus, it is beneficial to dynamically display the loop-play control.

In some other embodiments, when the duration of the audio and the time parameter of the video meet the preset condition, the electronic device may display a loop-play control on the audio editing page. Moreover, after the electronic device receives an operation for reselecting the other audio, if the duration of the other audio and the time parameter of the video do not meet the preset condition, the loop-play control may not be displayed on the audio editing page.

The operation for reselecting the other audio may include, but be not limited to, click, double-click, long-press, sliding and other types of operations. For example, when an area/component for editing the other audio is set on a page of the application (such as, the the editing instruction is an operation received on the area/component.

The other audio is different from the audio. The other audio is an audio in the application, such as a complete song, or a segment of a song, or a clipped segment of an audio, and the like.

In some embodiments, the application is the application 1 in FIG. 1A to FIG. 1B and FIG. 2A to FIG. 2M, the audio is the audio 1 in the embodiments of FIG. 2A to FIG. 2M, and the other audio is the audio 2 in the embodiments of FIG. 2A to FIG. 2M. In this case, the specific implementation of the operation for reselecting the other audio may refer to for example the description of the click operation performed in the area 1042 in the embodiments of FIG. 2A to FIG. 2M, which will not be repeated here.

In some other embodiments, the application is the application 1 in FIG. 1A to FIG. 1B, FIG. 3A to FIG. 3O and FIG. 4A to FIG. 4D, the audio is the audio 1 in the embodiments of FIG. 3B to FIG. 3O, and the other audio is the audio 2 in the embodiments of FIG. 3B to FIG. 3O. In this case, the specific implementation of the operation for reselecting the other audio may refer to the description of the operation performed in the window 202 in the embodiments of FIG. 3B to FIG. 3O, such as clicking the option 2021, which will not be repeated here.

Based on the above description, the electronic device may dynamically display the loop-play control on the audio editing page, which is beneficial to flexibly display the page of the application program according to practical cases.

Based on the description of the above embodiments, based on the intention of the user, the electronic device may control whether to loop the audio while playing the video.

In some embodiments, before receiving the editing instruction for the audio, the electronic device may acquire the video that has been captured.

For example, the electronic device may collect a video in real time and acquire the captured video, and then execute steps S101-S1041 in FIG. 5 to configure the audio to be played on a loop within the time range indicated by the time parameter of the video. The above specific implementation process may refer to the description of the second scenario, which will not be repeated here.

As another example, the electronic device may acquire the captured video from the local photo album of the electronic device, and then execute steps S101-S1041 in FIG. 5 to configure the audio to be played on a loop within the time range indicated by the time parameter of the video. The above specific implementation process may refer to the description in the second scenario, which will not be repeated here. The above specific implementation process may refer to the description in the third scenario, which will not be repeated here.

In this way, after configuring the audio to be on a loop within the time range indicated by the time parameter of the video, the electronic device may post the video. Thus, the electronic device may play the audio on a loop in the video playing process after receiving an operation for playing the video, to improve the play effect of the video and realize video sharing and video playing.

Based on the foregoing description, when the time parameter of the video is the play duration of the video, the duration of the audio and the time parameter of the video meeting the preset condition may include various cases. Hereinafter, the above process will be described in detail in combination with specific embodiments.

In some embodiments, when the play duration of the audio is less than the play duration of the video, the preset condition is met. Furthermore, the electronic device may display the loop-play control on the audio editing page.

As an example, the application is the application 1 in FIG. 1A to FIG. 1B, FIG. 3A to FIG. 3O and FIG. 4A to FIG. 4D, and the audio is the audio 1 in the embodiments of FIG. 3A to FIG. 3O and FIG. 4A to FIG. 4D. In this case, the specific implementation of the audio editing page may refer to the description of window 203 in the embodiment of FIG. 3E, and the specific implementation of the loop-play control may refer to the description of control 2032 in the embodiment of FIG. 3E, which will not be repeated here.

In some other embodiments, when the play duration of the audio is less than the play duration of the video and the licensed duration of audio is less than the play duration of the audio, the preset condition is met. Furthermore, the electronic device may display the loop-play control on the audio editing page.

As an example, the application is the application 1 in FIG. 1A to FIG. 1B, FIG. 3A to FIG. 3O and FIG. 4A to FIG. 4D, and the audio is the audio 1 in the embodiments of FIG. 3A to FIG. 3O and FIG. 4A to FIG. 4D. In this case, the specific implementation of the audio editing page may refer to the description of window 204 in the embodiment of FIG. 3H, and the specific implementation of the loop-play control may refer to the description of control 2042 in the embodiment of FIG. 3H, which will not be repeated here.

In some other embodiments, when the play duration of the audio is greater than the play duration of the video and the licensed duration of the audio is less than the play duration of video, the preset condition is met. Furthermore, the electronic device may display the loop-play control on the audio editing page.

As an example, the application is the application 1 in FIG. 1A to FIG. 1B, FIG. 3A to FIG. 3O and FIG. 4A to FIG. 4D, and the audio is the audio 1 in the embodiments of FIG. 3A to FIG. 3O and FIG. 4A to FIG. 4D. In this case, the specific implementation of the audio editing page may refer to the description of window 205 in the embodiment of FIG. 3K, and the specific implementation of the loop-play control may refer to the description of control 2052 in the embodiment of FIG. 3K, which will not be repeated here.

In other embodiments, after step S1041 is executed, the electronic device has configured the audio to be played on a loop within the time range indicated by the time parameter of the video, and then captures the video with the audio configured on a loop. The above specific implementation process may refer to the description in the first scenario, which will not be repeated here.

In this way, the electronic device may post the video, so that the electronic device may play the audio on a loop in the video playing process after receiving an operation for playing the video. As a result, it can improve the play effect of the video and realize video sharing and video playing.

Based on the foregoing description, when the time parameter of the video is the capturing mode duration for capturing the video, the duration of the audio and the time parameter of the video meeting the preset condition may include various cases. Hereinafter, the above process will be described in detail in combination with specific embodiments.

In some embodiments, when the play duration of the audio is less than the capturing mode duration, the preset condition is met. Furthermore, the electronic device may display loop-play control on the audio editing page.

As an example, the application is the application 1 in FIG. 1A to FIG. 1B and FIG. 2A to FIG. 2M, and the audio is the audio 1 in the embodiments of FIG. 2A to FIG. 2M. In this case, the specific implementation of the audio editing page may refer to the description of the window 106 in the embodiment of FIG. 2C, and the specific implementation of the loop-play control may refer to the description of the control 1062 in the embodiment of FIG. 2C, which will not be repeated here.

In some other embodiments, when the play duration of the audio is less than the capturing mode duration and the licensed duration of the audio is less than the play duration of the audio, the preset condition is met. Furthermore, the electronic device may display the loop-play control on the audio editing page.

As an example, the application is the application 1 in FIG. 1A to FIG. 1B and FIG. 2A to FIG. 2M, and the audio is the audio 1 in the embodiments of FIG. 2A to FIG. 2M. In this case, the specific implementation of the audio editing page may refer to the description of the window 107 in the embodiment of FIG. 2F, and the specific implementation of the loop-play control may refer to the description of the control 1072 in the embodiment of FIG. 2F, which will not be repeated here.

In some other embodiments, when the play duration of the audio is greater than the capturing mode duration and the licensed duration of audio is less than the capturing mode duration, the preset condition is met. Furthermore, the electronic device may display the loop-play control on the audio editing page.

As an example, the application is the application 1 in FIG. 1A to FIG. 1B and FIG. 2A to FIG. 2M, and the audio is the audio 1 in the embodiments of FIG. 2A to FIG. 2M. In this case, the specific implementation of the audio editing page may refer to the description of the window 108 in the embodiment of FIG. 2I, and the specific implementation of the loop-play control may refer to the description of the control 1082 in the embodiment of FIG. 2I, which will not be repeated here.

In addition, in addition to the loop-play control, the audio editing page may further include: a first area, where the first area is used to display a waveform of the audio.

In some embodiments, in the case that the loop-play control is detected to be enabled, the electronic device may, on the audio editing interface, automatically loop the waveform of portion of the audio selected by a user within the time range indicated by the time parameter of the video from the beginning to the end, until the time range is fully filled. The aforementioned process may indicate that the play corresponding to the portion of the audio selected by the user can be repeatedly displayed on the audio editing interface until the time range indicated by the time parameter of the video ends.

In this way, the electronic device may configure the audio corresponding to the waveform of the part selected by the user to be on a loop within the time range indicated by the time parameter of the video.

The operation for the waveform corresponding to the part of the audio selected by the user may include, but be not limited to, click, double-click, long-press, sliding and other types of operations.

In some embodiments, the application is the application 1 in FIG. 1A to FIG. 1B and FIG. 2A to FIG. 2M, and the audio is the audio 1 in the embodiments of FIG. 2A to FIG. 2M. In this case, the specific implementation of the first area may refer to the description of the small window cd in the embodiments of FIG. 2F to FIG. 2G. The part of the audio selected by the user is the audio corresponding to the music waveform in the small window cd. The specific implementation of the operation of the waveform corresponding to the part of the audio selected by the user may refer to the description of the operation performed in the window 107 in the embodiment of FIG. 2F, such as dragging the music waveform of the audio 1, which will not be repeated here.

In some other embodiments, the application is the application 1 in FIG. 1A to FIG. 1B and FIG. 2A to FIG. 2M, and the audio is the audio 1 in the embodiments of FIG. 2A to FIG. 2M. In this case, the specific implementation of the first area may refer to the description of the small window ef in the embodiments of FIG. 2I to FIG. 2J. The part of the audio selected by the user is the audio corresponding to the music waveform in the small window ef. The specific implementation of the operation of the waveform corresponding to the part of the audio selected by the user may refer to the description of the operation performed in the window 108 in the embodiment of FIG. 2I, such as dragging the music waveform of the audio 1, which will not be repeated here.

In some other embodiments, the application is the application 1 in FIG. 1A to FIG. 1B, FIG. 3A to FIG. 3O and FIG. 4A to FIG. 4D, and the audio is the audio 1 in the embodiments of FIG. 3B to FIG. 3O and FIG. 4A to FIG. 4D. In this case, the specific implementation of the first area may refer to the description of the small window cd in the embodiments of FIG. 3H to FIG. 3I. The part of the audio selected by the user is the audio corresponding to the music waveform in the small window cd. The specific implementation of the operation of the waveform corresponding to the part of the audio selected by the user may refer to the description of the operation performed in the window 204 in the embodiment of FIG. 3H, such as dragging the music waveform of the audio 1, which will not be repeated here.

In some other embodiments, the application is the application 1 in FIG. 1A to FIG. 1B, FIG. 3A to FIG. 3O and FIG. 4A to FIG. 4D, and the audio is the audio 1 in the embodiments of FIG. 3B to FIG. 3O and FIG. 4A to FIG. 4D. In this case, the specific implementation of the first area may refer to the description of the small window ef in the embodiments of FIG. 3K to FIG. 3L. The part of the audio selected by the user is the audio corresponding to the music waveform in the small window ef. The specific implementation of the operation of the waveform corresponding to the part of the audio selected by the user may refer to the description of the operation performed in the window 204 in the embodiment of FIG. 3K, such as dragging the music waveform of the audio 1, which will not be repeated here.

Exemplarily, an electronic device is provided according to the present disclosure. The electronic device includes: one or more processors: a memory: and one or more computer programs. The one or more computer programs are stored in the memory. The one or more processors, when executing the one or more computer programs, cause the electronic device to implement the video processing method for the application according to the foregoing embodiments.

Exemplarily, a chip system is provided according to the present disclosure. The chip system is applied to an electronic device including a memory and a sensor. The chip system includes: a processor, which implements the video processing method for an application according to the foregoing embodiments.

Exemplarily, a computer readable storage medium is provided according to the present disclosure. A computer program is stored on the computer readable storage medium. The computer program is executed by a processor to cause an electronic device to implement the video processing method for the application according to the foregoing embodiments.

Exemplarily, a computer program product is provided according to the present disclosure. The computer program product, when running on a computer, causes the computer to implement the video processing method for the application according to the foregoing embodiments.

In the above embodiments, all or part of the functions may be implemented by software, hardware, or a combination of software and hardware. When implemented by software, it may be implemented in whole or in part in the form of a computer program product. A computer program product includes one or more computer instructions. When the computer program instructions are loaded and executed on the computer, the processes or functions according to the embodiments of the present disclosure are produced in whole or in part. A computer may be a general purpose computer, special purpose computer, computer network, or other programmable device. Computer instructions may be stored on a computer readable storage medium. The computer readable storage medium may be any available medium that can be accessed by a computer, or a data storage device such as a server, a data center, etc. integrated with one or more available media. The available media may be magnetic media (e.g., floppy disk, hard disk, magnetic tape), optical media (e.g., DVD), or semiconductor media (e.g., solid state disk (SSD)) and the like.

It should be noted that the relationship terms "first", "second" and the like herein are used for distinguishing an entity or operation from another entity or operation, but not intended to necessitate or imply an actual relationship or order between these entities or operations. Further, the terms "include", "comprise" or any variant thereof are intended to encompass nonexclusive inclusion such that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of another identical element in such process, method, article or device.

The above are only specific implementations of the present disclosure, such that those skilled in the art can understand or implement the present disclosure. It is obvious for those skilled in the art to make many modifications to these embodiments. The general principle defined herein may be applied to other embodiments without departing from the spirit or scope of the embodiments of the present disclosure. Therefore, the embodiments of the present disclosure is not limited to the embodiments illustrated herein, rather, should be defined by the broadest scope consistent with the principle and novel features disclosed herein.

The invention claimed is:

1. A video processing method for an application, comprising:
   receiving an editing instruction for an audio, in a process of editing a video;
   acquiring a duration of the audio and a time parameter of the video, in response to the editing instruction;
   displaying a loop-play control on an audio editing page, in a case that the duration of the audio and the time parameter of the video meet a preset condition;
   configuring the audio to be on a loop within a time range indicated by the time parameter of the video, in a case that the loop-play control is detected to be enabled; and
   configuring the audio to be not on a loop within the time range indicated by the time parameter of the video, in a case that the loop-play control is detected to be disabled.

2. The method according to claim 1, further comprising:
   displaying the audio editing page without the loop-play control, in a case that the duration of the audio and the time parameter of the video do not meet the preset condition.

3. The method according to claim 1, wherein before receiving the editing instruction for the audio, the method further comprises:
   acquiring a captured video.

4. The method according to claim 3, wherein the time parameter of the video is a play duration of the video; and
   the duration of the audio and the time parameter of the video meeting the preset condition comprises:
      meeting the preset condition, in a case that a play duration of the audio is less than the play duration of the video;
      meeting the preset condition, in a case that the play duration of the audio is less than the play duration of the video and a licensed duration of the audio is less than the play duration of the audio; or
      meeting the preset condition, in a case that the play duration of the audio is greater than the play duration of the video and the licensed duration of the audio is less than the play duration of the video.

5. The method according to claim 1- or 2, further comprising:
   capturing the video by using the audio configured on a loop.

6. The method according to claim 5, wherein the time parameter of the video is a capturing mode duration for capturing the video; and
   the duration of the audio and the time parameter of the video meeting the preset condition comprises:
      meeting the preset condition, in a case that a play duration of the audio is less than the capturing mode duration;
      meeting the preset condition, in a case that the play duration of the audio is less than the capturing mode duration and a licensed duration of the audio is less than the play duration of the audio; or
      meeting the preset condition, in a case that the play duration of the audio is greater than the capturing mode duration and the licensed duration of the audio is less than the capturing mode duration.

7. The method according to claim 1, wherein in the case that the loop-play control is detected to be enabled, the method further comprises:
   on the audio editing interface, automatically looping a waveform of the audio of a portion selected by a user from a beginning to an end, until the time range indicated by the time parameter of the video is fully filled.

8. An electronic device, comprising:
one or more processors;
a memory; and
one or more computer programs stored in the memory, wherein the one or more computer programs, when executed by the one or more processors, cause the electronic device to;
receive an editing instruction for an audio, in a process of editing a video;
acquire a duration of the audio and a time parameter of the video, in response to the editing instruction;
display a loop-play control on an audio editing page, in a case that the duration of the audio and the time parameter of the video meet a preset condition;
configure the audio to be on a loop within a time range indicated by the time parameter of the video, in a case that the loop-play control is detected to be enabled; and
configure the audio to be not on a loop within the time range indicated by the time parameter of the video, in a case that the loop-play control is detected to be disabled.

9. A non-transitory computer storage medium, wherein the computer storage medium comprises computer instructions, and the computer instructions, when running on an electronic device, cause the electronic device to;
receive an editing instruction for an audio, in a process of editing a video;
acquire a duration of the audio and a time parameter of the video, in response to the editing instruction;
display a loop-play control on an audio editing page, in a case that the duration of the audio and the time parameter of the video meet a preset condition;
configure the audio to be on a loop within a time range indicated by the time parameter of the video, in a case that the loop-play control is detected to be enabled; and
configure the audio to be not on a loop within the time range indicated by the time parameter of the video, in a case that the loop-play control is detected to be disabled.

10. The electronic device according to claim 8, wherein the one or more computer programs, when executed by the one or more processors, cause the electronic device to:
display the audio editing page without the loop-play control, in a case that the duration of the audio and the time parameter of the video do not meet the preset condition.

11. The electronic device according to claim 8, wherein the one or more computer programs, when executed by the one or more processors, cause the electronic device to:
acquire a captured video before the editing instruction for the audio is received.

12. The electronic device according to claim 11, wherein the time parameter of the video is a play duration of the video; and
the duration of the audio and the time parameter of the video meeting the preset condition comprises:
meeting the preset condition, in a case that a play duration of the audio is less than the play duration of the video;
meeting the preset condition, in a case that the play duration of the audio is less than the play duration of the video and a licensed duration of the audio is less than the play duration of the audio; or
meeting the preset condition, in a case that the play duration of the audio is greater than the play duration of the video and the licensed duration of the audio is less than the play duration of the video.

13. The electronic device according to claim 8, wherein the one or more computer programs, when executed by the one or more processors, cause the electronic device to:
capture the video by using the audio configured on a loop.

14. The electronic device according to claim 13, wherein the time parameter of the video is a capturing mode duration for capturing the video; and
the duration of the audio and the time parameter of the video meeting the preset condition comprises:
meeting the preset condition, in a case that a play duration of the audio is less than the capturing mode duration;
meeting the preset condition, in a case that the play duration of the audio is less than the capturing mode duration and a licensed duration of the audio is less than the play duration of the audio; or
meeting the preset condition, in a case that the play duration of the audio is greater than the capturing mode duration and the licensed duration of the audio is less than the capturing mode duration.

15. The electronic device according to claim 8, wherein the one or more computer programs, when executed by the one or more processors, cause the electronic device to:
on the audio editing interface, automatically loop a waveform of the audio of a portion selected by a user from a beginning to an end, until the time range indicated by the time parameter of the video is fully filled, in the case that the loop-play control is detected to be enabled.

16. The non-transitory computer storage medium according to claim 9, wherein the computer instructions, when running on an electronic device, cause the electronic device to:
display the audio editing page without the loop-play control, in a case that the duration of the audio and the time parameter of the video do not meet the preset condition.

17. The non-transitory computer storage medium according to claim 9, wherein the computer instructions, when running on an electronic device, cause the electronic device to:
acquire a captured video before the editing instruction for the audio is received.

18. The non-transitory computer storage medium according to claim 17, wherein the time parameter of the video is a play duration of the video; and
the duration of the audio and the time parameter of the video meeting the preset condition comprises:
meeting the preset condition, in a case that a play duration of the audio is less than the play duration of the video;
meeting the preset condition, in a case that the play duration of the audio is less than the play duration of the video and a licensed duration of the audio is less than the play duration of the audio; or
meeting the preset condition, in a case that the play duration of the audio is greater than the play duration of the video and the licensed duration of the audio is less than the play duration of the video.

19. The non-transitory computer storage medium according to claim 9, wherein the computer instructions, when running on an electronic device, cause the electronic device to:
capture the video by using the audio configured on a loop.

20. The non-transitory computer storage medium according to claim 19, the time parameter of the video is a capturing mode duration for capturing the video; and
the duration of the audio and the time parameter of the video meeting the preset condition comprises:
meeting the preset condition, in a case that a play duration of the audio is less than the capturing mode duration;
meeting the preset condition, in a case that the play duration of the audio is less than the capturing mode duration and a licensed duration of the audio is less than the play duration of the audio; or
meeting the preset condition, in a case that the play duration of the audio is greater than the capturing mode duration and the licensed duration of the audio is less than the capturing mode duration.

* * * * *